US010591281B2

(12) United States Patent
Sabitov et al.

(10) Patent No.: US 10,591,281 B2
(45) Date of Patent: Mar. 17, 2020

(54) APPARATUS AND METHODS FOR FACIAL RECOGNITION AND VIDEO ANALYTICS TO IDENTIFY INDIVIDUALS IN CONTEXTUAL VIDEO STREAMS

(71) Applicant: 15 Seconds of Fame, Inc., New York, NY (US)

(72) Inventors: Ruslan Sabitov, Jersey City, NJ (US); Alexander Betser, Brooklyn, NY (US); Adam Resnick, Parkland, FL (US); E. Michael Huestis, Holmes, NY (US); Brett Terry Joshpe, New York, NY (US)

(73) Assignee: 15 Seconds of Fame, Inc., Santa Monica, CA (US)

( * ) Notice: Subject to any disclaimer, the term of this patent is extended or adjusted under 35 U.S.C. 154(b) by 0 days.

(21) Appl. No.: 16/150,717

(22) Filed: Oct. 3, 2018

(65) Prior Publication Data

US 2019/0137261 A1    May 9, 2019

Related U.S. Application Data

(63) Continuation of application No. 15/211,261, filed on Jul. 15, 2016, now Pat. No. 10,094,655.
(Continued)

(51) Int. Cl.
*G01B 11/14* (2006.01)
*G01J 3/453* (2006.01)
(Continued)

(52) U.S. Cl.
CPC ............... *G01B 11/14* (2013.01); *G01J 3/26* (2013.01); *G01J 3/2823* (2013.01);
(Continued)

(58) Field of Classification Search
CPC . G01B 11/14; G01J 3/26; G01J 3/2823; G01J 3/4535; G06K 9/00288;
(Continued)

(56) References Cited

U.S. PATENT DOCUMENTS 5,144,685 A    9/1992    Nasar et al.
6,532,345 B1   3/2003    Gluck
(Continued)

FOREIGN PATENT DOCUMENTS

JP    2003-317100    11/2003
WO    WO 2009/123711   10/2009
(Continued)

OTHER PUBLICATIONS

Office Action for U.S. Appl. No. 15/211,261, dated Nov. 30, 2017, 14 pages.
(Continued)

*Primary Examiner* — Daniel G Mariam
(74) *Attorney, Agent, or Firm* — Cooley LLP

(57) ABSTRACT

An apparatus includes a memory, a communication interface in communication with the memory and configured to communicate via a network, and a processor in communication with the memory and the communication interface. The processor receives facial image data associated with a user of a client device, registers the facial image data, and stores the facial image data and contextual data associated with the user in a database. The processor also receives video stream data from at least one image capture device in communication with the network, analyzes the video stream data and contextual data associated with the video stream data to define analyzed video data and analyzed contextual data, respectively, and defines a confidence level based on comparing the data associated with the video stream data to the data stored in the database. The processor defines a
(Continued)

user-specific contextual video stream when the confidence level satisfies a criterion.

20 Claims, 10 Drawing Sheets

Related U.S. Application Data

(60) Provisional application No. 62/192,854, filed on Jul. 15, 2015.

(51) Int. Cl.
*G06K 9/00* (2006.01)
*G01J 3/28* (2006.01)
*G01J 3/26* (2006.01)

(52) U.S. Cl.
CPC ........ *G01J 3/4535* (2013.01); *G06K 9/00677* (2013.01); *G06K 9/00771* (2013.01)

(58) Field of Classification Search
CPC .............. G06K 9/00718; G06K 9/0771; G06K 2009/00738; G06K 2009/27
USPC .......................................... 382/118, 209, 218
See application file for complete search history.

(56) References Cited

U.S. PATENT DOCUMENTS

| | | |
|---|---|---|
| 6,591,068 B1 | 7/2003 | Dietz |
| 6,745,186 B1 | 6/2004 | Testa et al. |
| 6,819,783 B2 | 11/2004 | Goldberg et al. |
| 7,023,367 B1 | 4/2006 | Manganaro |
| 7,035,440 B2 | 4/2006 | Kaku |
| 7,260,587 B2 | 8/2007 | Testa et al. |
| 7,330,875 B1 | 2/2008 | Parasnis et al. |
| 7,376,276 B2 | 5/2008 | Shniberg et al. |
| 7,391,886 B1 | 5/2008 | Clark et al. |
| 7,472,134 B2 | 12/2008 | Kaku |
| 7,494,061 B2 | 2/2009 | Reinhold |
| 7,526,106 B1 | 4/2009 | Clark et al. |
| 7,532,811 B2 | 5/2009 | Sauder |
| 7,552,228 B2 | 6/2009 | Parasnis et al. |
| 7,561,723 B2 | 7/2009 | Goldberg et al. |
| 7,619,660 B2 | 11/2009 | Grosvenor |
| 7,684,651 B2 | 3/2010 | Tang et al. |
| 7,783,085 B2 | 8/2010 | Perlmutter et al. |
| 7,800,646 B2 | 9/2010 | Martin |
| 7,860,347 B2 | 12/2010 | Tang et al. |
| 7,881,968 B2 | 2/2011 | David |
| 7,907,755 B1 | 3/2011 | Perlmutter et al. |
| 7,953,690 B2 | 5/2011 | Luo et al. |
| 7,965,908 B2 | 6/2011 | Hayashi |
| 7,966,223 B2 | 6/2011 | David |
| 7,995,806 B2 | 8/2011 | Goh et al. |
| 8,014,572 B2 | 9/2011 | Xiao et al. |
| 8,055,029 B2 | 11/2011 | Petrescu et al. |
| 8,144,944 B2 | 3/2012 | Ishii |
| 8,189,880 B2 | 5/2012 | Wen et al. |
| 8,204,437 B1 | 6/2012 | Rothschild |
| 8,233,679 B2 | 7/2012 | Perlmutter et al. |
| 8,254,699 B1 | 8/2012 | Zhao et al. |
| 8,260,674 B2 | 9/2012 | David |
| 8,279,323 B2 | 10/2012 | Ishii |
| 8,284,990 B2 | 10/2012 | Ma et al. |
| 8,306,284 B2 | 11/2012 | Goldberg et al. |
| 8,315,463 B2 | 11/2012 | Gallagher et al. |
| 8,325,999 B2 | 12/2012 | Kapoor et al. |
| 8,341,145 B2 | 12/2012 | Dodson et al. |
| 8,406,481 B2 | 3/2013 | Goldberg |
| 8,422,739 B2 | 4/2013 | Ianculescu et al. |
| 8,560,625 B1 | 10/2013 | Hardman et al. |
| 8,630,956 B2 | 1/2014 | Arisawa et al. |
| 8,723,962 B2 | 5/2014 | Herring et al. |
| 8,799,277 B2 | 8/2014 | Park et al. |
| 8,825,872 B2 | 9/2014 | Reisman |
| 8,831,275 B2 | 9/2014 | Goldberg |
| 8,885,960 B2 | 11/2014 | Sauve et al. |
| 8,898,464 B2 | 11/2014 | Bono et al. |
| 8,928,760 B2 | 1/2015 | Schultz et al. |
| 8,942,533 B2 | 1/2015 | Wiklof |
| 8,949,619 B2 | 2/2015 | Parry et al. |
| 8,957,981 B2 | 2/2015 | Fredlund et al. |
| 9,007,420 B1 | 4/2015 | Passe |
| 9,008,724 B2 | 4/2015 | Lord |
| 9,104,907 B2 | 8/2015 | Whitehill et al. |
| 9,131,147 B2 | 9/2015 | Quarfordt et al. |
| 9,189,682 B2 | 11/2015 | Salvador et al. |
| 9,317,530 B2 | 4/2016 | Papakipos et al. |
| 9,396,354 B1 | 7/2016 | Murphy et al. |
| 9,420,315 B2 | 8/2016 | Melanson |
| 9,712,800 B2 | 7/2017 | St. Clair |
| 9,723,334 B2 | 8/2017 | Melanson |
| 9,967,596 B2 | 5/2018 | Melanson |
| 10,019,136 B1 | 7/2018 | Ozog |
| 10,027,726 B1 | 7/2018 | Ozog |
| 10,027,727 B1 | 7/2018 | Ozog |
| 10,094,655 B2 | 10/2018 | Sabitov et al. |
| 10,121,061 B2 | 11/2018 | Dickinson et al. |
| 2003/0023452 A1 | 1/2003 | Novais et al. |
| 2003/0086123 A1 | 5/2003 | Torrens-Burton |
| 2003/0118216 A1 | 6/2003 | Goldberg |
| 2004/0008872 A1 | 1/2004 | Goldberg |
| 2004/0156535 A1 | 8/2004 | Goldberg et al. |
| 2005/0117022 A1 | 6/2005 | Marchant |
| 2005/0254505 A1 | 11/2005 | Chang et al. |
| 2007/0003113 A1 | 1/2007 | Goldberg |
| 2008/0310688 A1 | 12/2008 | Goldberg |
| 2009/0185723 A1 | 7/2009 | Kurtz et al. |
| 2009/0316961 A1 | 12/2009 | Gomez Suarez et al. |
| 2010/0036875 A1 | 2/2010 | Miezianko et al. |
| 2010/0060727 A1 | 3/2010 | Steinberg et al. |
| 2010/0150407 A1 | 6/2010 | Cheswick |
| 2010/0158315 A1 | 6/2010 | Martin |
| 2011/0022529 A1 | 1/2011 | Barsoba et al. |
| 2011/0064281 A1 | 3/2011 | Chan |
| 2011/0066743 A1 | 3/2011 | Hurley et al. |
| 2011/0142016 A1 | 6/2011 | Chatterjee |
| 2011/0182482 A1 | 7/2011 | Winters et al. |
| 2011/0182485 A1 | 7/2011 | Shochat et al. |
| 2011/0188713 A1 | 8/2011 | Chin et al. |
| 2011/0211736 A1 | 9/2011 | Krupka et al. |
| 2011/0211737 A1 | 9/2011 | Krupka et al. |
| 2011/0238755 A1 | 9/2011 | Khan et al. |
| 2011/0307399 A1 | 12/2011 | Russell et al. |
| 2012/0008837 A1 | 1/2012 | Goldberg et al. |
| 2012/0027256 A1 | 2/2012 | Kiyohara et al. |
| 2012/0056722 A1 | 3/2012 | Kawaguchi |
| 2012/0250950 A1 | 10/2012 | Papakipos et al. |
| 2012/0278395 A1 | 11/2012 | Garcia |
| 2013/0040660 A1 | 2/2013 | Fisher et al. |
| 2013/0089243 A1 | 4/2013 | Sauve et al. |
| 2013/0117365 A1 | 5/2013 | Padmanabhan et al. |
| 2013/0188844 A1 | 7/2013 | Goldberg |
| 2013/0194438 A1 | 8/2013 | Sweet, III et al. |
| 2013/0265450 A1 | 10/2013 | Barnes, Jr. |
| 2013/0269013 A1 | 10/2013 | Parry et al. |
| 2013/0286223 A1 | 10/2013 | Latta et al. |
| 2014/0028201 A1 | 1/2014 | Chang |
| 2014/0064576 A1 | 3/2014 | Gong et al. |
| 2014/0289534 A1 | 9/2014 | Parry et al. |
| 2014/0342330 A1 | 11/2014 | Freeman et al. |
| 2014/0350840 A1 | 11/2014 | D'Argenio et al. |
| 2014/0361974 A1 | 12/2014 | Li et al. |
| 2015/0062334 A1 | 3/2015 | Dickinson et al. |
| 2015/0066920 A1 | 3/2015 | Barta |
| 2015/0081785 A1 | 3/2015 | Angelsmark et al. |
| 2015/0081791 A1 | 3/2015 | Jacobs |
| 2015/0124107 A1 | 5/2015 | Muriello et al. |
| 2015/0169946 A1 | 6/2015 | Needleman |
| 2015/0172853 A1 | 6/2015 | Liu et al. |
| 2015/0181379 A1 | 6/2015 | Pai et al. |
| 2015/0227609 A1 | 8/2015 | Shoemaker et al. |

(56) References Cited

U.S. PATENT DOCUMENTS

| | | |
|---|---|---|
| 2015/0227780 A1 | 8/2015 | Tussy |
| 2015/0227782 A1 | 8/2015 | Salvador et al. |
| 2015/0285856 A1 | 10/2015 | Garcia et al. |
| 2015/0304368 A1 | 10/2015 | Vaccari et al. |
| 2015/0347827 A1 | 12/2015 | Dickinson et al. |
| 2016/0073010 A1 | 3/2016 | Cronin et al. |
| 2016/0105772 A1 | 4/2016 | Cohen |
| 2016/0150124 A1 | 5/2016 | Panda et al. |
| 2016/0191434 A1 | 6/2016 | Rice |
| 2016/0205358 A1 | 7/2016 | Dickinson |
| 2017/0017834 A1 | 1/2017 | Sabitov et al. |
| 2017/0116466 A1 | 4/2017 | Resnick et al. |
| 2018/0025220 A1 | 1/2018 | Dickinson et al. |
| 2018/0234709 A1 | 8/2018 | Melanson |
| 2018/0341835 A1 | 11/2018 | Siminoff |
| 2019/0034710 A1 | 1/2019 | Dickinson et al. |

FOREIGN PATENT DOCUMENTS

| | | |
|---|---|---|
| WO | WO 2011/017653 | 2/2011 |
| WO | WO 2011/097041 | 8/2011 |
| WO | WO 2012/112992 | 8/2012 |
| WO | WO 2012/134756 | 10/2012 |
| WO | WO 2012/142054 | 10/2012 |
| WO | WO 2012/149397 | 11/2012 |
| WO | WO 2014/043738 A1 | 3/2014 |
| WO | WO 2014/100519 | 6/2014 |
| WO | WO 2015/030911 | 3/2015 |
| WO | WO 2015/031863 | 3/2015 |
| WO | WP 2015/085246 | 6/2015 |

OTHER PUBLICATIONS

Office Action for U.S. Appl. No. 15/299,934, dated May 24, 2018, 15 pages.
Final Office Action the United States Patent and Trademark Office for U.S. Appl. No. 15/299,934, dated Dec. 6, 2018, 17 pages.
International Search Report and Written Opinion for International Application No. PCT/US2016/058189 dated Jan. 13, 2017, 8 pages.
International Search Report and Written Opinion for International Application No. PCT/US2016/042489, dated Oct. 21, 2016, 9 pages.
PR Newswire, FacialNetwork Releases New Demo of Facial Recognition App NameTag on Google Glass, Receives Cease and Desist from Facebook, Sep. 10, 2014, Retrieved from Internet: http://www.prnewswire.com/news-releases/facialnetwork-releases-new-demo-of-facial-recognition-app-nametag-on-google-glass-receives-cease-and-desist-from-facebook-274649581.html.
Penny Crosman, Biometric Tipping Point: USAA Deploys Face, Voice Recognition, Feb. 3, 2015. Retrieved from the Internet: http://www.americanbanker.com/news/bank-technology/biometric-tipping-point-usaa-deploys-face-voice-recognition-1072509-1.html?zkPrintable=1&nopagination=1.
Ironic Sans, Idea: Fun with facial recognition, Jan. 11, 2007. Retrieved from the Internet: http://www.ironicsans.com/2007/01/idea_fun_with_facial_recogniti.html.
Katy Daniells, FaceLook: Coca-Cola's Facial Recognition App, Aug. 2, 2011. Retrieved from the Internet: http://www.ditigalbuzzblog.com/facelook-coca-colas-facial-recognitin-app/.
Collen Kriel, Alibaba shows off facial recognition to secure mobile payments, Mar. 16, 2015. Retrieved from the Internet: http://siliconangle.com/blog/2015/03/16/alibaba-shows-off-facial-recognition-to-secure-mobile-payments/.
Co tree, Selfies—Automatic selfie by multiple faces detection, Released Mar. 26, 2015, Retrieved from the Internet: https://itunes.apple.com/us/app/selfies-automatic-selfie-by/id976846726?mt=8.
Julian Mitchell, Staples Center, AEG and Fanpics Partner to Put Fans at the Center of Major Sports Moments, May 27, 2015. Retrieved from the Internet: http://www.forbes.com/sites/julianmitchell/2015/05/27/staples-center-and-fanpics-team-up-putting-fans-at-the-center-of-major-sports-momemts/2/#60ccf4ceba08.
Mori Rothman, Bringing facial recognition technology to the 'kiss cam' at sporting events, PBS Newshour, Sep. 24, 2013, Retrieved from the Internet: http://www.pbs.org/newshour/rundown/dhs-taps-into-crowd-cam-for-facial-recognition-research/.
Justin Lee, Securus patents facial recognition system for video visitation sessions, Biometric Update.com. Jun. 16, 2015. Retrieved from the Internet: http://www.biometricupdate.com/201506/securus-patents-facial-recognition-system-for-video-visitation-sessions.
Edgar Cervantes, Facebook will recognize you in photos where your face is not showing, Android Authority, Jun. 23, 2015. Retrieved from the Internet: http://www.androidauthority.com/facebook-recognize-photos-without-face-618957/.
Zo0mTM, The World's First Secure Selfie 3D Authentication App, Announced by FacialNetwork, Jul. 8, 2015. Retrieved from the Internet: http://www.marketwatch.com/story/zoomtm-the-worlds-first-secure-selfie-3d-authentication-app-announced-by-facialnetwork-2015-07-08.
Ryan Whitwam, Facebook developing way to fingerprint the camera you used to take a photo, Sep. 20, 2015. Retrieved from the Internet: http://www.geek.com/news/facebook-developing-way-to-fingerprint-the-camera-you-used-to-take-a-photo-1634542/.
Seatrade Cruise News, The Image Group provides photo buyers mobile-friendly instant gratification, Nov. 8, 2015. Retrieved from the Internet: http://www.seatrade-cruise.com/news/news-headlines/image-provides-photo-buyers-mobile-friendly-instant-gratification.html.
Planet biometrics, Facial recognition startup will scour web for user images, Feb. 3, 2016. Retrieved from the Internet: http://www.planetbiometrics.com/article-details/i/4100/desc/facial-recognition-startup-will-scour-web-for-user-images/.
Ashley Gurbal Kritzer, Tampa Bay Business Journal, Vinik—backed Seattle startup brings new tech to Amalie Arena for Lightning games, Feb. 5, 2016. Retrieved from the Internet: http://www.bizjournals.com/tampabay/blog/morning-edition/2016/02/vinik-backed-seattle-startup-brings-new-tech-to.html.
PR Newswire, Sys.con Media, Waldo Photos Closes $5 Million Seed Funding Round Led by Upfront Ventures, Jan. 21, 2016. Retrieved from the Internet: http://news.sys-con.com/node/3643721.
Texas TechPulse, Waldo Photos: Finding Your Photos in the Proverbial Haystack, Feb. 3, 2016. Retrieved from the Internet: http://www.texastechpulse.com/waldo_photos_finding_your_photos_in_the_proverbial_haystack/s-0063812.html.
Rachel Metz, A New Way to Use Facial Recognition to Find Photos of You, Feb. 2, 2016, MIT Technology Review. Retrieved from the Internet: https://www.technologyreview.com/s/600690/a-new-way-to-use-facial-recognition-to-find-photos-of-you/.
Colin Morris, HomeAdvisor co-founders launch photo marketplace powered by facial recognition, Built in Austin, Jan. 22, 2016. Retrieved from the Internet: http://www.builtinaustin.com/2016/01/22/waldo-photos-5-million-seed-round.
PR Rocket, Photo-Sharing Image Recognition Tools Advocacy Campaign Launched by ScanMyPhotos.com, Mar. 8, 2016. Retrieved from the Internet: http://www.pressreleaserocket.net/photo-sharing-image-recognition-tools-advocacy-campaign-launched-by-scanmyphotos-com/419781/.
Taylor Soper, Ex-Microsoft manager raises cash from sports team owners to enhance the fan experience at live games, GeekWire, Feb. 4, 2016. Retrieved from the Internet: http://www.geekwire.com/2016/ex-microsoft-manager-raises-cash-sports-team-owners-enhance-fan-experience-live-games/.
Dave Gershaorn, A New App Automatically Sends That Group Photo to Your Friends, Popular Science, Mar. 7, 2016. Retrieved from the Internet: http://www.popsci.com/new-app-automatically-sends-that-group-photo-to-your-friends.
Rob Price, Snapchat has figured out a way to use facial recognition tech to protect people's privacy, Business Insider, Jul. 19, 2016. Retrieved from the Internet: http://www.businessinsider.com/new-snapchat-patent-uses-facial-recognition-tech-protect-privacy-photos-blurring-emojis-2016-7.

(56) References Cited

OTHER PUBLICATIONS

The Ghost in the Camera, How facial recognition technology mines your face for information, Feb. 2016.
ComputerWorld, Face Recognition app FindFace may make you want to take down all your online photos, May 18, 2016.
Kim Brunhuber, Facial recognition tech is allowing stores to reward customers, CBC News. May 2, 2016.
Sarah Perez, Lambda Labs Is Launching a Facial Recognition API for Google Glass, May 23, 2013. Retrieved from the Internet: http://techcrunch.com/2013/05/23/lambda-labs-is-launching-a-facial-recognition-api-for-google-glass/.
Doug Bolton, FindFace app which uses facial recognition to identify strangers on social media takes Russia by storm, May 18, 2016. http://www.independent.co.uk/life-style/gadgets-and-tech/news/findface-vk-app-social-media-facial-recognition-android-ios-a7035556,html.
Michelle Ma, Moving cameras talk to each other to identify, track pedestrians, Nov. 12, 2014. Retrieved from the Internet: http://www.washington.edu/news/2014/11/12/moving-cameras-talk-to-each-other-to-identify-track-pedestrians/.
Ben Coxworth, "Software could determine where a video was shot, based on scenery and ambient sound," Feb. 19, 2015, Gizmag.com, retrieved from the Internet at http://www.gizmag.com/video-geolocation-IQorithms/36172 on Oct. 6, 2015.
OSnap, Tutorial 2: Time-Lapse—Daily Self Portrait, Retrieved Nov. 30, 2016 from the Internet: http://www.osnapphotoapp.com/tutorial2.php, 6 pages.
Fanpics, Tell Your Story. Retrieved Nov. 30, 2016 from the Internet: https://www.fanpics.com/about, 3 pages.
Waldo Photos, Retrieved from the Internet: https://waldo.photos/, published Jan. 21, 2016, Retrieved Nov. 30, 2016 from the Internet http://news.sys-con.com/node/3643721, 4 pages.
Sarah Perez, Waldo Raises $5 Million for a Photo-Finding Platform Targeting Professional Photographers & Events, TechCrunch, Jan. 21, 2016. Retrieved from the Internet: Dec. 2, 2016 at https://techcrunch.com/2016/01/21/waldo-raises-5-million-for-a-photo-finding-platform-targeting-professional-photographers-events/, 9 pages.
Magtoapp, Inc., iTunes Preview, Celebtwin: Celebrity Look Alike Lite, Updated Jul. 5, 2016, Retrieved Dec. 2, 2016 from the Internet: https://itunes.apple.com/us/app/celebtwin-celebrity-look-alike/id381722077?mt=8, 2 pages.
Lamdba Labs, API Documentation. Retrieved from the Internet on Jan. 17, 2019 at https://lambdal.com/api-documentation, 2 pages.
Knoto, published 2016, Retrieved Dec. 12, 2016 from the Internet: http://knoto.com/, 5 pages.

Nauman, et al. Stanford University, "Leveraging Context to Resolve Identity in Photo Albums", 2005, 10 pages.
Amy Held, Google App Goes Viral Making an Art Out of Matching Faces to Paintings, Jan. 15, 2018, NPR.org, Retrieved from the Internet: https://www.npr.org/sections/thetwo-way/2018/01/15/578151195/google-app-goes-viral-making-an-art-out-of-matching-faces-to-paintings.
Chris Welch, How to Stop Facebook from Looking for You With Face Recognition, Mar. 27, 2018. Retrieved from the Internet: https://www.theverge.com/2018/3/27/17165150/facebook-face-recognition-how-to-turn-off-disable.
Vlad Savoy, Sony Promises Better Face Identification Through Depth-Sensing Lasers, Jan. 2, 2019. Retrieved from the Internet: https://www.theverge.com/2019/1/2/18164881/sony-tof-laser-depthsensing-3d-camera-report.
Jack Alexander, Next Generation of iPhones to 'Revolutionize' Photography, May Include Sony's 3D Technology and Advanced Facial Recognition, Dec. 29, 2018. Retrieved from the Internet: https://fstoppers.com/news/next-generation-iPhones-revolutionize-photography-may-include-sonys-3D-322630.
Peter Holley, This Patent Shows Amazon May Seek to Create a 'Database of Suspicious Persons' Using Facial-Recognition Technology, Dec. 18, 2018, Washingtonpost.com, Retrieved from the Internet: https://www.washingtonpost.com/technology/2018/12/13/this-patent-shows-amazon-may-seek-create-database-suspicious-persons-using-facial-recognition-technology/?utm_term=.476ede26a7f8.
Dave Brooks, Nathan Hubbard's Plan to 'Rival' Ticketmaster Makes Big Claims, But Offers Few Details, May 4, 2018, Retrieved from the Internet: https://www.billboard.com/articles/business/8454599/nathan-hubbard-ticketmaster-rival.
Extended Search Report issued by the European Patent Office for Application No. 16825245.0, dated Mar. 20, 2019, 8 pages.
Extended Search Report issued by the European Patent Office for Application No. 16794804.1, dated Apr. 30, 2019, 17 pages.
Zhang et al., "Image Based Localization in Urban Environments", 3D Data Processing, Visualization, and Transmission, Third International Symposium on, IEEE, PI, pp. 33-40 (2006).
Barr et al., "Face Recognition From Video: A Review", Draft 17 International Journal of Pattern Recognition and Artificial Intelligence, 2012, 56 pages, Retrieved from the Internet Nov. 19, 2013: URL:http://www3.nd.edu/-kwb/BarrEtAllJPRAI 2012.pdf.
Non-Final Office Action the United States Patent and Trademark Office for U.S. Appl. No. 15/299,934, dated Jul. 26, 2019, 17 pages.
Extended Search Report issued by the European Patent Office for Application No. 16794804.1, dated Jul. 31, 2019, 14 pages.
Office Action issued by the Japanese Patent Office for Application No. 2018-521489, dated Dec. 9.2019, 11 pages (including English translation).

APPARATUS AND METHODS FOR FACIAL RECOGNITION AND VIDEO ANALYTICS TO IDENTIFY INDIVIDUALS IN CONTEXTUAL VIDEO STREAMS

CROSS-REFERENCE TO RELATED APPLICATIONS

This application is a continuation of U.S. patent application Ser. No. 15/211,261, now U.S. Pat. No. 10,094,655, entitled "Apparatus and Methods for Facial Recognition and Video Analytics to Identify Individuals in Contextual Video Streams," filed Jul. 15, 2016 which claims priority to and the benefit of U.S. Provisional Patent Application Ser. No. 62/192,854 entitled, "Apparatus and Methods for Facial Recognition and Video Analytics to Identify Individuals in Contextual Video Streams," filed Jul. 15, 2015, the disclosure of each of which is incorporated herein by reference in its entirety.

BACKGROUND

The embodiments described herein relate generally to facial recognition and video analytics, and more particularly, to apparatus and methods for registering an individual based on facial recognition data, analyzing contextual video stream data to identify the individual, and providing contextual video streams of the individual.

Increases in the availability and capability of electronic devices such as cameras, tablets, smartphones, etc. have allowed some people to take pictures and/or capture video of their experiences. For example, the inclusion and improvement of cameras in smartphones, tablets, and/or other similar devices have led to increases in those devices being used to take pictures (e.g., photographic data, image data, etc.) and videos (e.g., video stream data). While, it has become easier for some people to take pictures and/or videos of their experiences, in some instances, there can still be challenges in including the desired parties (including the person who would otherwise be taking the picture or video). Moreover, a person generally has to remember and/or have the chance to take the picture and/or video, and failing to do can result in a lost opportunity.

In some instances, venues and/or events such as sporting events, concerts, rallies, graduations, and/or the like have cameras that can take pictures and/or video of those in attendance. In some instances, however, analyzing, parsing, and/or otherwise making the pictures and/or video stream available can use a relatively large amount of resources, can be inaccurate, and/or can fail to provide associated contextual data or the like.

Thus, a need exists for improved apparatus and methods for registering an individual based on facial recognition data, analyzing contextual picture data and/or contextual video stream data to identify the individual, and providing contextual picture(s) and/or contextual video stream(s) of the individual, for example, at public events, based on the facial recognition data and/or video analytics.

SUMMARY

In some embodiments, an apparatus includes a memory, a communication interface in communication with the memory and configured to communicate via a network, and a processor in communication with the memory and the communication interface. The processor is configured to receive, via the network and the communication interface, facial image data associated with a user of a client device. In response to receiving the facial image data, the processor (1) registers the facial image data associated with the user based on at least one of two-dimensional facial recognition analytics, three-dimensional facial recognition analytics, or convolutional neural nets (CNN) and (2) stores the facial image data and contextual data associated with the user in a database operably coupled to the processor. The processor is also configured to receive, via the network and the communication interface, video stream data from at least one image capture device in communication with the network. In response to receiving the video stream data, the processor (1) analyzes the video stream data based on at least one of the two-dimensional facial recognition analytics, the three-dimensional facial recognition analytics, or the CNN to define analyzed video data, (2) analyzes contextual data associated with the video stream data to define analyzed contextual data, and (3) defines a confidence level based on comparing the analyzed video data to the facial image data stored in the database and comparing the analyzed contextual data to the contextual data associated with the user and stored in the database. The processor is configured to define data representing a user-specific contextual video stream when the confidence level satisfies a criterion.

DETAILED DESCRIPTION

Figure 1A:
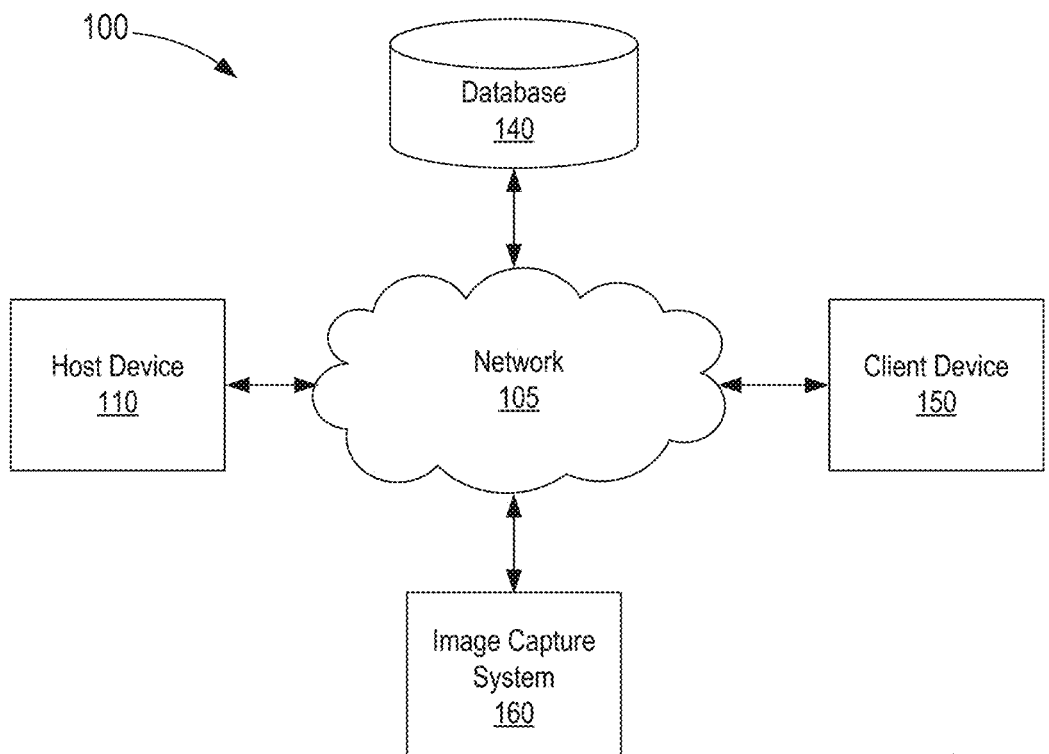
FIG. 1A is a schematic illustration of a recognition system according to an embodiment.

The embodiments described herein relate to registering a user based on facial recognition data, analyzing contextual video stream data to identify the individual, and providing contextual video streams of the user based on the facial recognition data and/or video analytics of a video stream. In some embodiments, an apparatus includes a memory, a communication interface in communication with the memory and configured to communicate via a network, and a processor in communication with the memory and the communication interface. The processor is configured to receive, via the network and the communication interface, facial image data associated with a user of a client device. In response to receiving the facial image data, the processor (1) registers the facial image data associated with the user based on at least one of two-dimensional facial recognition analytics, three-dimensional facial recognition analytics, or convolutional neural nets (CNN) and (2) stores the facial image data and contextual data associated with the user in a database operably coupled to the processor. The processor is also configured to receive, via the network and the communication interface, video stream data from at least one image capture device in communication with the network. In response to receiving the video stream data, the processor (1) analyzes the video stream data based on at least one of the two-dimensional facial recognition analytics, the three-dimensional facial recognition analytics, or the CNN to define analyzed video data, (2) analyzes contextual data associated with the video stream data to define analyzed contextual data, and (3) defines a confidence level based on comparing the analyzed video data to the facial image data stored in the database and comparing the analyzed contextual data to the contextual data associated with the user and stored in the database. The processor is configured to define data representing a user-specific contextual video stream when the confidence level satisfies a criterion.

In some embodiments, a method of image analysis includes receiving, at a host device and from a client device via a network, a signal indicative of a request to register facial image data associated with a user. The facial image data associated with the user is registered via facial recognition and image analysis and stored in a database in communication with the host device. Contextual video stream data associated with an event is received at the host device. The contextual video stream data is analyzed via video analytics to determine if the contextual video stream data satisfies a criterion associated with facial recognition of the facial image data in the contextual video stream data. A contextual video stream of the user is defined when the criterion associated with facial recognition of the facial image data in the contextual video stream data is satisfied. The host device sends a signal indicative of an instruction to present the contextual video stream of the user on a display of the client device.

In some embodiments, a system includes an image capture assembly in communication with a network and a host device having at least a processor and a memory and being in communication with the network and a database. The image capture assembly includes at least one image capture device configured to capture video stream data that is associated with a predetermined context. The host device is configured to (1) receive facial image data of a user from a client device via the network, (2) register the facial image data via facial recognition and image analysis, and (3) store the facial image data in the database. The host device is configured to receive the video stream data from the image capture assembly and data associated with the predetermined context. The host device is configured to define a confidence level based on comparing the video stream data to the facial image data and comparing the data associated with the predetermined context to contextual data associated with the user. The host device is further configured to define user-specific contextual image data and to send the user-specific contextual image data to the client device via the network when the confidence level satisfies a criterion.

As used in this specification, the singular forms "a," "an" and "the" include plural referents unless the context clearly dictates otherwise. Thus, for example, the term "a module" is intended to mean a single module or a combination of modules, "a network" is intended to mean one or more networks, or a combination thereof.

As used herein the term "module" refers to any assembly and/or set of operatively-coupled electrical components that can include, for example, a memory, a processor, electrical traces, optical connectors, software (executing in hardware), and/or the like. For example, a module executed in the processor can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor) capable of performing one or more specific functions associated with that module.

As used herein, the term "contextual video stream" refers to a video stream that includes and/or is associated with contextual data. Contextual data can be, for example, time and/or date data, location data, event and/or venue data, status data, personal identification data, group and/or network data, recipient data, facial recognition data, profile data, etc. When the embodiments are described herein as sending and/or receiving "video streams" (e.g., to or at a host device) the video streams can be sent and/or received independent of the contextual data associated with the video stream. For example, a client device can send a video stream to a host device and in response, the host device can retrieve and/or request contextual data associated with the video stream from any number of sources (e.g., independent of and/or after receiving the video stream). Once the host device receives the video stream data and the contextual data associated with the video stream data, the host device can define, for example, a contextual video stream and/or any other suitable contextual image data. In still other embodiments, video streams and/or image data can be sent and/or received without contextual data. Moreover, while referred to as a "video stream," in other instances, a device can send and/or receive a single and/or still image (e.g., picture). In other instances, a device can send and/or receive any number of individual frames or the like, which can collectively form a video stream.

The embodiments and methods described herein can use facial recognition data to (1) search for one or more images of a registered user (e.g., a person who's facial recognition data is predetermined) in a video stream and (2) provide a video stream including contextual data to a client device associated with the user (e.g., a smartphone, tablet, computer, wearable electronic device, etc.). Facial recognition generally involves analyzing one or more images of a person's face to determine, for example, salient features of his or her facial structure (e.g., cheekbones, chin, ears, eyes, jaw, nose, hairline, etc.) and then defining a qualitative and/or quantitative data set associated with and/or otherwise representing the salient features. One approach, for example, includes extracting data associated with salient features of a person's face and defining a data set including geometric and/or coordinate based information (e.g., a three dimensional (3-D) analysis of facial recognition data). Another approach, for example, includes distilling image data into qualitative values and comparing those values to templates or the like (e.g., a two dimensional (2-D) analysis of facial recognition data). In some instances, another approach can include any suitable combination of 3-D analytics and 2-D analytics.

Some facial recognition methods and/or algorithms include Principal Component Analysis using Eigenfaces (e.g., Eigenvector associated with facial recognition), Linear Discriminate Analysis, Elastic Bunch Graph Matching using the Fisherface algorithm, Hidden Markov model, Multilinear Subspace Learning using tensor representation, neuronal motivated dynamic link matching, convolutional neural nets (CNN), and/or the like or combination thereof. Any of the embodiments and/or methods described herein can use and/or implement any suitable facial recognition method and/or algorithm or combination thereof such as those described above. In addition, some of the embodiments and/or methods described herein can be used to register initial facial recognition data of a user and then to compare image data included in a video stream with the initial facial recognition data of the user. As such, it is desirable to have accurate and/or complete initial facial recognition data. Thus, the embodiments and/or methods described herein can include methods, steps, and/or processes associated with aligning the face of a user to a template, frame, boundary, marker, indicator, and/or the like.

FIG. 1A is a schematic illustration of a video recognition system 100 according to an embodiment. In some instances, the video recognition system 100 (also referred to herein as "system") can be used to present a contextual video stream of a user (e.g., also referred to as a "user-specific contextual video stream" or a "user-specific video stream") based at least in part on facial recognition data. At least a portion of the system 100 can be, for example, represented and/or described by a set of instructions or code stored in a memory and executed in a processor of an electronic device (e.g., a host device, a server or group of servers, a personal computer (PC), a network device, etc.) and/or the like. For example, in some embodiments, a host device can receive a signal associated with a request to register facial recognition data associated with a user and in response, can store the facial recognition data in a database. Similarly, the host device can receive a signal associated with video stream data. In some instances, one or more processors of the host device can then execute a set of instructions or code, stored in a memory of the host device, associated with analyzing the video stream data to determine if one or more images of the user are present in the video stream based at least in part on the facial recognition data. If images are found in the video stream data, the one or more processors can isolate an associated portion of the video stream data. Moreover, the one or more processors can execute a set of instructions or code to (1) associate contextual data such as time, location, event, etc. with video stream data and (2) define a contextual video stream of the user (e.g., a user-specific contextual video stream). The one or more processors can then send, to a client device associated with the user, a signal indicative of an instruction to present the contextual video stream of the user on a display of the client device.

The system 100 includes a host device 110 in communication with a database 140, a client device 150, and an image capture system 160. The host device 110 can be any suitable host device such as a server or group of servers, a network management device, a personal computer (PC), a processing unit, and/or the like in electronic communication with the database 140, the client device 150, and the image capture system 160. For example, in this embodiment, the host device 110 can be a server or group of servers (disposed in substantially the same location and/or facility or distributed in more than one location) in electronic communication with the database 140, the client device 150, and the image capture system 160 via a network 105, as described in further detail herein.

The client device 150 can be any suitable device such as a PC, a laptop, a convertible laptop, a tablet, a personal digital assistant (PDA), a smartphone, a wearable electronic device (e.g., a smart watch, etc.), and/or the like. Although not shown in FIG. 1A, in some embodiments, the client device 150 can be an electronic device that includes at least a memory, a processor, a communication interface, a display, and one or more inputs. The memory, the processor, the communication interface, the display, and the input(s) can be connected and/or electrically coupled to each other such as to allow signals to be sent therebetween. For example, in some embodiments, the memory can be a random access memory (RAM), a memory buffer, a hard drive, a read-only memory (ROM), an erasable programmable read-only memory (EPROM), and/or the like. The processor can be any suitable processing device configured to run or execute a set of instructions or code (e.g., stored in the memory) such as a general-purpose processor (GPP), a central processing unit (CPU), an accelerated processing unit (APU), a graphics processor unit (GPU), an Application Specific Integrated Circuit (ASIC), and/or the like. Such a processor can run or execute a set of instructions or code stored in the memory associated with using a PC application, a mobile application, an internet web browser, a cellular and/or wireless communication (via a network), and/or the like. More specifically, the processor can execute a set of instructions or code stored in the memory associated with sending facial recognition data to and/or receiving facial recognition data and/or contextual video stream data from the host device 110, as described in further detail herein.

The communication interface of the client device 150 can be any suitable module and/or device that can place the resource in communication with the host device 110 such as one or more network interface cards or the like. Such a network interface card can include, for example, an Ethernet port, a Universal Serial Bus (USB) port, a WiFi® radio, a Bluetooth® radio, a near field communication (NFC) radio, and/or a cellular radio that can place the client device 150 in communication with the host device 110 via a network (e.g., the network 105) or the like. As such, the communication interface can send signals to and/or receive signals from the processor associated with electronically communicating with the host device 110 via the network 105.

The display of the client device 150 can be, for example, a cathode ray tube (CRT) monitor, a liquid crystal display (LCD) monitor, a light emitting diode (LED) monitor, and/or the like that can graphically represent any suitable portion of the system 100 (e.g., a graphical user interface (GUI) associated with a webpage, PC application, mobile application, and/or the like). In some embodiments, such a display can be and/or can include a touch screen configured to receive a haptic user input. In some instances, the display can be configured to graphically represent data associated with a facial recognition process and/or data associated with a video stream, as described in further detail herein.

The input(s) of the client device 150 can be any suitable module and/or device that can receive one or more inputs (e.g., user inputs) and that can send signals to and/or receive signals from the processor associated with the one or more inputs. In some embodiments, the input(s) can be and/or can include ports, plugs, and/or other interfaces configured to be placed in electronic communication with a device. For example, such an input can be a universal serial bus (USB) port, an Institute of Electrical and Electronics Engineers (IEEE) 1394 (FireWire) port, a Thunderbolt port, a Lightning port, and/or the like. In some embodiments, the display can be included in a touch screen or the like configured to receive a haptic user input.

In some embodiments, an input can be a camera and/or other imaging device. For example, in some embodiments, such a camera can be integrated into the client device 150 (e.g., as in smartphones, tablets, laptops, etc.) and/or can be in communication with the client device 150 via a port or the like (e.g., such as those described above). The camera can be any suitable imaging device such as, for example, a webcam or a forward facing camera included in a smartphone or tablet (e.g., a camera pointed substantially in the same direction as the display). In this manner, the user can manipulate the client device 150 to cause the camera to capture an image (e.g., a photo) or a video. Moreover, in some instances, the display can be configured to graphically represent data associated with an image captured by the camera. By way of example, in some embodiments, the client device 150 can be a smartphone, tablet, or wearable electronic device that includes a forward facing camera. In some instances, a user can manipulate the client device 150 to take a picture or video of himself or herself via the camera (e.g., also known as a "selfie").

In some instances, a camera (e.g., an input) included in the client device 150 can be used to capture an image of a user's face, which in turn, can be used to register facial recognition data associated with the user. Specifically, the user can manipulate the client device 150 such that the camera captures an image of the user's face. In some instances, the display can be configured to graphically represent an indication, frame, boundary, guide, and/or any other suitable graphical representation of data, which can provide an indication to a user associated with a desired alignment for the image of the user's face. Once the camera captures the desired image, the processor can receive and/or retrieve data associated with the image of the user's face and, in turn, can execute a set of instructions or code (e.g., stored in the memory) associated with at least a portion of a facial recognition process. For example, in some instances, the processor can execute a set of instructions or code associated with verifying an alignment between the indication, frame, boundary, etc. graphically represented on the display and the captured image of the user's face. In some instances, the client device 150 can be configured to send, via the network 105, a signal associated with data representing the image of the user to the host device 110 when the alignment is verified, and in response, the host device 110 can perform any suitable facial recognition process or processes on the data to register the facial image data of the user, as described in further detail herein.

The image capture system 160 (also referred to herein as "image capture assembly") can be and/or can include any suitable device or devices configured to capture image data. For example, the image capture system 160 can be and/or can include one or more cameras and/or image recording devices configured to capture an image (e.g., a photo) and/or record a video stream. In some embodiments, the image capture system 160 can include multiple cameras in communication with a central computing device such as a server, a personal computer, a data storage device (e.g., a NAS, a database, etc.), and/or the like. In such embodiments, the cameras can each send image data to the central computing device (e.g., via a wired or wireless connection, a port, a serial bus, a network, and/or the like), which in turn, can store the image data in a memory and/or other data storage device. Moreover, the central computing device can be in communication with the host device 110 (e.g., via the network 105) and can be configured to send at least a portion of the image data to the host device 110. Although shown in FIG. 1A as being in communication with the host device 110 via the network 105, in other embodiments, such a central computing device can be included in, a part of, and/or otherwise coupled to the host device 110. In still other embodiments, the cameras can be in communication with the host device 110 (e.g., via the network 105) without such a central computing device.

In some embodiments, the image capture system 160 can be associated with and/or owned by a venue or the like such as, for example, a sports arena, a theme park, a theater, and/or any other suitable venue. In other embodiments, the image capture system 160 can be used in or at a venue but owned by a different entity (e.g., an entity licensed and/or otherwise authorized to use the image capture system 160 in or at the venue such as, for example, a television camera at a sporting event). In still other embodiments, the image capture system 160 can include any number of client devices or the like such as smartphones, tablets, etc., which can be used as cameras or recorders. In such embodiments, at least some of the client devices can be in communication with the host device 110 and/or a central computing device associated with the venue (e.g., as described above).

Figure 1B:
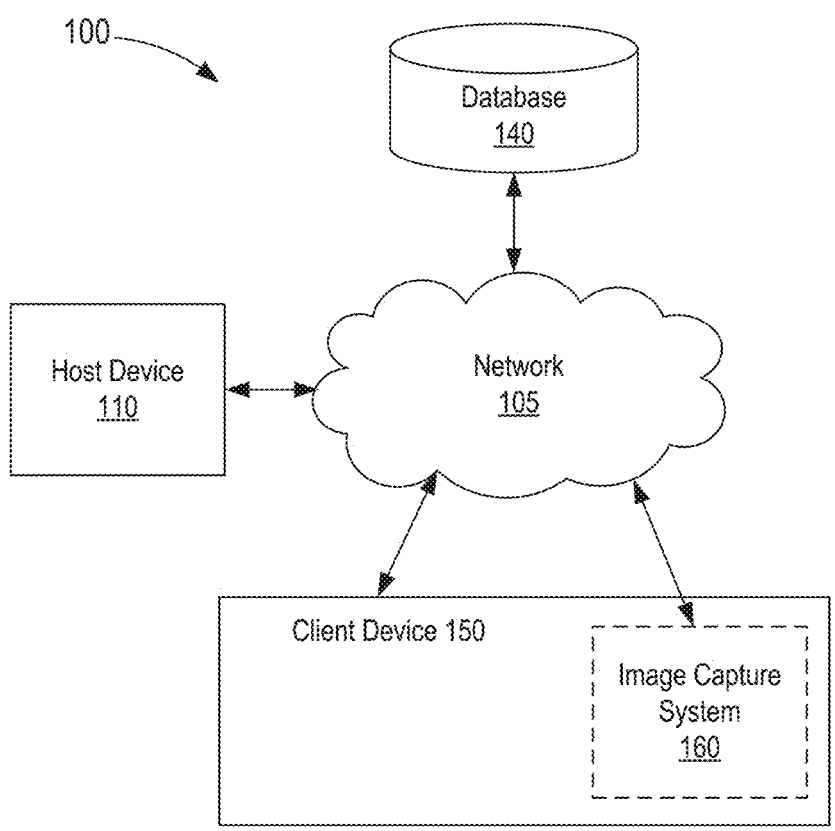
FIG. 1B is a schematic illustration of a recognition system according to another embodiment.

For example, in some embodiments, the camera integrated into the client device 150 can form and/or comprise at least a portion of the image capture system 160, as shown in FIG. 1B. In this manner, the user can manipulate the client device 150 to capture a picture and/or video recording and in response, the client device 150 can upload and/or otherwise send the picture (e.g., image data, photographic data, etc.) and/or video recording data to the host device 110. In some instances, the picture and/or video recording data can be stored on the client device 150 for any suitable time and uploaded and/or sent to the host device 110 at a later time. Moreover, the picture and/or video recording data can be stored on the client device 150 after the picture and/or video recording data is sent to the host device 110. That is to say, sending the picture and/or video recording data does not delete and/or remove the picture and/or video recording data from the client device 150 (e.g., a copy of the data is sent to the host device 110). Thus, as shown in FIG. 1B, the image capture system 160 need not be associated with a particular event and/or venue. In such instances, the user can manipulate the client device 150 (e.g., an application of the client device 150) to capture user generated content (e.g., pictures, image data, photographic data, video stream data, etc.) via the camera and/or recording device (e.g., the image capture system 160) integrated into the client device 150.

In some instances, the image capture system 160 is configured to capture image data associated with a venue and/or event. In other words, the image capture system 160 is configured to capture image data within a predetermined, known, and/or given context. For example, in some instances, the image capture system 160 can include one or more image capture devices (e.g., cameras and/or video recorders) that are installed at an arena or the like and that are configured to capture image data associated with patrons, guests, performers, etc. at the arena. In this manner, the image capture system 160 is configured to capture image data within the context of the arena and/or an event occurring at the arena. Thus, the captured image data can be, for example, "contextual image data." That is to say, the image data is associated with contextual data. As described in further detail herein, the host device 110 can receive the image data and/or video stream data from the image capture system 160 and data associated with the context (e.g., "contextual data" associated with the arena and/or the event occurring at the arena, and/or any other suitable contextual and/or metadata) from any suitable data source and/or the like; can associate the contextual data with, for example, the image data; can define a user-specific contextual image and/or user-specific contextual video stream associated with, for example, a user of the client device 150; and can send the user-specific contextual image and/or user-specific contextual video stream associated with the user to the client device 150.

As described above, the client device 150 and the image capture system 160 can be in communication with the host device 110 via one or more networks. For example, as shown in FIG. 1A, the client device 150 and the image capture system 160 can be in communication with the host device 110 via its communication interface and the network 105. The network 105 can be any type of network such as, for example, a local area network (LAN), a virtual network such as a virtual local area network (VLAN), a music local area network (MLAN), a wide area network (WAN), a metropolitan area network (MAN), a worldwide interoperability for microwave access network (WiMAX), a cellular network, the Internet, and/or any other suitable network implemented as a wired and/or wireless network. By way of example, the network 105 can be implemented as a wireless local area network (WLAN) based on the Institute of Electrical and Electronics Engineers (IEEE) 802.11 standards (also known as "WiFi®"). Moreover, the network 105 can include a combination of networks of any type such as, for example, a LAN or WLAN and the Internet. In some embodiments, the client device 150 can communicate with the host device 110 and the network 105 via intermediate networks and/or alternate networks (not shown), which can be similar to or different from the network 105. As such, the client device 150 can send data to and/or receive data from the host device 110 using multiple communication modes (e.g., associated with any of the networks described above) that may or may not be transmitted to the host device 110 using a common network. For example, the client device 150 can be a mobile telephone (e.g., smartphone) connected to the host device 110 via a cellular network and the Internet (e.g., the network 105).

In some instances, the network can facilitate, for example, a peer networking session or the like. In such instances, the peer networking session can include, for example, client devices and/or any other suitable electronic device, each of which share a common characteristic. For example, in some instances, the peer networking session can include any suitable client device (e.g., an electronic device registered in the database 140 and/or the like) that is within a predetermined proximity of a venue, event, location, etc. For example, in some instances, such a peer networking session can include any number of registered client devices present at a venue (e.g., a sports event). In some instances, the peer networking session can be automatically established based on contextual data associated with the user and/or the client device. In other instances, the peer networking session can be automatically established based on one or more users "checking-in" and/or otherwise publicizing his or her presence at the venue or the like (e.g., "squawk" the user's presence). In some instances, a user can "check-in" at a time the user arrived at an event or the like (e.g., sports event, concert, wedding, birthday party, gathering, etc.), at a time of registration, at a time of capturing an image or video stream, and/or the like. Moreover, the "check-in" can include identifying information such as, for example, geolocation data, date and time data, personal or user identification data, etc.

In other instances, a user can manually establish a peer networking session including, for example, a predetermined set or group of users. In some instances, such peer networking sessions can be public networks, private networks, and/or otherwise limited access networks. For example, in some instances, a user can request to join a networking session and/or can receive an invite to join a networking session and/or the like. In some instances, establishing a peer networking session can, for example, facilitate communication (e.g., group chat sessions or the like) and/or sharing of image and/or video data between users included in the peer networking session.

The host device 110 can be any suitable device configured to send data to and/or receive data from the database 140, the client device 150, and/or the image capture system 160. In some embodiments, the host device 110 can function as, for example, a server device (e.g., a web server device), a network management device, an administrator device, and/or so forth. In some embodiments, the host device 110 can be a group of servers or devices housed together in or on the same blade, rack, and/or facility or distributed in or on multiple blades, racks, and/or facilities. The host device 110 includes at least a memory 115, a processor 120, and a communication interface 125 (see e.g., FIG. 2). In some embodiments, the memory 115, the processor 120, and the communication interface 125 are connected and/or electrically coupled so that signals can be sent between the memory 115, the processor 120, and the communication interface 125. The host device 110 can also include and/or can otherwise be operably coupled to the database 140 configured to store user data, facial recognition data, contextual data (e.g., associated with a time, location, venue, event, etc.), video streams, and/or the like.

The memory 115 can be, for example, RAM, a memory buffer, a hard drive, a database, a ROM, an EPROM, an EEPROM, and/or so forth. In some instances, the memory 115 of the host device 110 includes a set of instructions or code used to perform one or more facial recognition actions and/or used to communicate (e.g., send and/or receive) data with at least one device (e.g., the client device 150) using one or more suitable communication modes. The processor 120 can be any suitable processor such as, for example, a GPP, a CPU, an APU, a GPU, a network processor, a front-end processor, an ASIC, an FPGA, and/or the like. Thus, the processor 120 can be configured to perform and/or execute a set of instructions, modules, and/or code stored in the memory 115. For example, the processor 120 can be configured to execute a set of instructions and/or modules associated with, inter alia, receiving facial recognition data (e.g., from the client device 150), analyzing the facial recognition data, registering and/or storing the facial recognition data, receiving video stream data (e.g., from the image capture system 160), analyzing the video stream data and comparing the video stream data to the facial recognition data, sending video stream data (e.g., to the client device 150), and/or any other suitable process, as further described herein. The communication interface 125 can be any suitable device that can place the host device 110 in communication with the database 140, the client device 150, the image capture device 160 and/or any other suitable device and/or service in communication with the network 105 (e.g., any device configured to gather and/or at least temporarily store data such as facial recognition data, video streams, and/or the like). In some embodiments, the communication interface 125 can include one or more wired and/or wireless interfaces, such as, for example, network interface cards (NIC), Ethernet interfaces, optical carrier (OC) interfaces, asynchronous transfer mode (ATM) interfaces, and/or wireless interfaces (e.g., a WiFi® radio, a Bluetooth® radio, an NFC radio, and/or the like).

Returning to FIG. 1A, the database 140 associated with the host device 110 can be any suitable database such as, for example, a relational database, an object database, an object-relational database, a hierarchical database, a network database, an entity-relationship database, a structured query language (SQL) database, an extensible markup language (XML) database, digital repository, a media library, a cloud server or storage, and/or the like. In some embodiments, the host device 110 can be in communication with the database 140 over any suitable network (e.g., the network 105) via the communication interface 125. In such embodiments, the database 140 can be included in or stored by a network attached storage (NAS) device that can communicate with the host device 110 over the network 105 and/or any other network(s). In other embodiments, the database can be stored in the memory 115 of the host device 110. In still other embodiments, the database 140 can be operably coupled to the host device 110 via a cable, a bus, a server rack, and/or the like.

The database 140 can store and/or at least temporarily retain data associated with the video recognition system 100. For example, in some instances, the database 140 can store data associated with and/or otherwise representing user profiles, resource lists, facial recognition data, modes, and/or methods, contextual data (e.g., associated with a time, location, venue, event, etc.), video streams or portions thereof, and/or the like. In other words, the database 140 can store data associated with users whose facial image data has be registered by the system 100 (e.g., "registered users"). In some embodiments, the database 140 can be and/or can include a relational database, in which data can be stored, for example, in tables, matrices, vectors, etc. according to the relational model. By way of example, in some instances, the host device 110 can be configured to store in the database 140 video stream data received from a video or image source (e.g., the image capture system 160) and contextual data associated with the video stream data. In some instances, the video stream data and the contextual data associated therewith can collectively define a contextual video stream or the like, as described in further detail herein. In other instances, the video stream data can be stored in the database 140 without contextual data or the like.

Although the host device 110 is shown and described with reference to FIG. 1A as including and/or otherwise being operably coupled to the database 140 (e.g., a single database), in some embodiments, the host device 110 can be operably coupled to any number of databases. Such databases can be configured to store at least a portion of a data set associated with the system 100. For example, in some embodiments, the host device 110 can be operably coupled to and/or otherwise in communication with a first database configured to receive and at least temporarily store user data, user profiles, and/or the like and a second database configured to receive and at least temporarily store video stream data and contextual data associated with the video stream data. In some embodiments, the host device 110 can be operably coupled to and/or otherwise in communication with a database that is stored in or on the client device 150 and/or the image capture system 160. In other words, at least a portion of a database can be implemented in and/or stored by the client device 150 and/or the image capture system 160. In this manner, the host device 110 and, in some instances, the database 140 can be in communication with any number of databases that can be physically disposed in a different location than the host device 110, while being in communication with the host device 110 (e.g., via the network 105). In some instances, a first portion of the database 140 can be included in and/or otherwise stored by the memory of the host device 110 and a second portion of the database 140 can be included in and/or otherwise stored by the memory of the client device 150.

In some embodiments, the database 140 can be a searchable database and/or repository. For example, in some instances, the database 140 can store video stream data associated with a user (e.g., contextual video stream data). In some instances, the user can search the database 140 to retrieve and/or view one or more contextual video streams associated with the user that are stored in the database 140. In some instances, the user can have a limited access and/or privileges to update, edit, delete, and/or add video streams associated with his or her user profile (e.g., user-specific contextual video streams and/or the like). In some instances, the user can, for example, update and/or modify permissions and/or access associated with the user-specific video streams associated with that user. For example, in some embodiments, the user can redistribute, share, and/or save data associated with the user. In other instances, the user can block access to user-specific data and/or the like. In some instances, the user can redistribute and/or share content, data, and/or video streams otherwise shared with the user (e.g., that may or may not be associated with the user).

Figure 2:
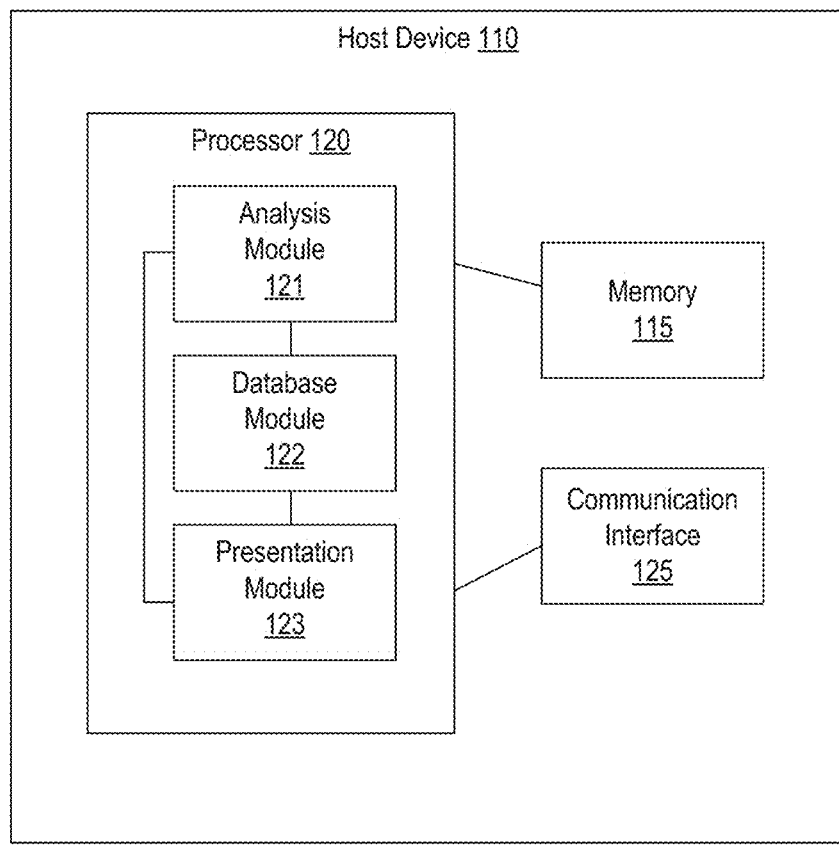
FIG. 2 is a schematic illustration of a host device included in the recognition system of FIGS. 1A and/or 1B.

Returning to FIG. 2, as described above, the processor 120 of the host device 110 can be configured to execute specific modules. The modules can be, for example, hardware modules, software modules stored in the memory 115 and/or executed in the processor 120, and/or any combination thereof. For example, as shown in FIG. 2, the processor 120 includes and/or executes an analysis module 121, a database module 122, and a presentation module 123. As shown in FIG. 2, the analysis module 121, the database module 122, and the presentation module 123 can be connected and/or electrically coupled. As such, signals can be sent between the analysis module 121, the database module 122, and the presentation module 123.

The analysis module 121 includes a set of instructions that can be executed by the processor 120 (or portion thereof) that are associated with receiving and/or collecting data associated with a facial recognition of a user and/or a video stream. More particularly, the analysis module 121 can be operably coupled to and/or otherwise in communication with the communication interface 125 and can receive data therefrom. Such data can be, for example, associated with a user (e.g., facial recognition information, profile information, preferences, activity logs, location information, contact information, calendar information, social media activity information, etc.), a venue (e.g., location data, resource data, event schedule), an event, and/or the like. As described in further detail herein, the analysis module 121 can receive a signal from the communication interface 125 associated with a request and/or an instruction to perform and/or execute any number of processes associated with facial recognition.

In some instances, the analysis module 121 can receive data from the communication interface 125 at substantially real-time. That is to say, in some instances, an electronic device included in the system 100 (e.g., the client device 150) can be manipulated by a user to define and/or update data associated with facial recognition of the user and once defined and/or updated can send the data to the host device 110 via the network 105. Thus, the communication interface 125 can, upon receiving the data, send a signal to the analysis module 121, which receives the data in a very short time period after being defined and/or updated by the electronic device. In other embodiments, the analysis module 121 can receive data from the communication interface 125 at a predetermined rate or the like based on, for example, an aggregation process, a current and/or predicted processor, memory, and/or network load, and/or the like.

As described above, the analysis module 121 can be configured to receive, aggregate, analyze, sort, parse, alter, and/or update data associated with a facial recognition process or the like. More particularly, in some instances, a user can manipulate the client device 150 to capture one or more images or video streams of his or her face (as described in further detail herein) and, in turn, can send signals associated with and/or representing the image data to the host device 110, for example, via the network 105. In some instances, the communication interface 125 can receive the image data and can send an associated signal to the analysis module 121. Upon receipt, the analysis module 121 can execute a set of instructions or code (e.g., stored in the analysis module 121 and/or in the memory 115) associated with aggregating, analyzing, sorting, updating, parsing, and/or otherwise processing the image data. More specifically, the analysis module 121 can perform any suitable facial recognition process and/or algorithm such as, for example, those described above. In some instances, the facial recognition process and/or algorithm can be an initial registering of image data associated with a user. For example, the analysis module 121 can define a data set associated with and/or otherwise representing a template, contour, profile, shape, feature, arrangement, characteristic, etc. of the user's face (also referred to herein as an "initial data set," "initial facial image," and/or "facial image"). In other words, in some instances, the user can manipulate the client device 150 to capture a "selfie" (e.g., picture and/or video of the user and particularly the user's face) and in response, the client device 150 can send an initial data set including, for example, the selfie data to the host device 110. In some instances, prior to capturing the selfie and/or prior to sending data to the host device 110, the user of the client device 150 can be prompted (e.g., on the display of the client device 150) to accept terms of service including sharing of personal and/or location data, etc.

After defining the initial data set, the analysis module 121 can send a signal to, for example, the database module 122 indicative of an instruction to store the initial data set in the database 140. In some instances, the analysis module 121 can define a user profile or the like that includes the initial data set and any other suitable information or data associated with the user such as, for example, a picture, video recording and/or audio recording, personal and/or identifying information (e.g., name, age, sex, birthday, hobbies, etc.), calendar information, contact information (e.g., associated with the user and/or the user's friends, family, associates, etc.), device information (e.g., a media access control (MAC) address, Internet Protocol (IP) address, etc.), location information (e.g., current location data and/or historical location data), social media information (e.g., profile information, user name, password, friends or contacts lists, etc.), and/or any other suitable information or data. As such, the analysis module 121 can send a signal to the database module 122 indicative of an instruction to store the user profile data in the database 140, as described in further detail herein. In some instances, the host device 110 can send a confirmation to the client device 150 after the initial data is stored in the database 140. In addition, any of the user profile data and/or any portion of the initial data set can stored on the client device 150.

Although the analysis module 121 is described above as performing and/or executing a facial recognition process or the like to define the initial data set, in some instances, the analysis module 121 can receive video stream data (or image data, for example, from a photograph) and can be configured to analyze and/or process the video stream data to determine if a portion of the video stream data matches any suitable portion of the initial data set. That is to say, the analysis module 121 can use the initial data set as a template against which data included in the video stream is compared. Said another way, the analysis module 121 performs a facial recognition process and/or analysis on the video stream data based at least in part on the initial data set. In some embodiments, the host device 110 and more particularly, the communication interface 125 receives the video stream data from the image capture system 160 either directly (e.g., from one or more cameras via the network 105) or indirectly (e.g., from a computing device via the network 105, which in turn, is in communication with the one or more cameras). In some embodiments, the analysis module 121 can be configured to analyze and/or process the video stream data based at least in part on separating, parsing, sorting, and/or otherwise deconstructing the video stream data into its individual frames (e.g., a static image at a predetermined time during the video stream). As such, the analysis module 121 can compare and/or analyze data included in the video stream frame relative to the initial data set.

In some instances, the analysis module 121 can also analyze the video stream data to determine contextual information associated with the video stream such as, for example, location, venue, time, coinciding event (e.g., a sports team scoring a goal, being captured, for example, on a "kiss cam," etc.), and/or any other suitable contextual information. In some instances, the analysis module 121 can be configured to match, aggregate, and/or otherwise associate at least a portion of the video stream to the contextual data. For example, in some instances, the video stream data can represent, for example, a user at a sporting event. In such instances, the contextual data can be, for example, a video stream of the sporting event or game, and can include data associated with a time, location, venue, teams, etc. As such, the analysis module 121 can be configured to aggregate the video stream data and the contextual data such that the video stream data and the contextual data substantially coincide (e.g., occur and/or capture data associated with substantially the same time). In other instances, the contextual data can include data associated with any other suitable context.

If the analysis module 121 determines that at least a portion of the data in the video stream satisfies a criterion (e.g., matches the initial data set to a predetermined and/or acceptable probability), the analysis module 121 can send one or more signals to the database module 122 indicative of an instruction to store at least the portion of the image and/or video stream data in the database 140 and to associate and/or otherwise store that data with the initial data set. In some instances, the analysis module 121 can send signals to the database module 122 such that individual frames are stored in the database 140, which in turn, can be subsequently retrieved and processed to define a video stream. In other instances, the analysis module 121 can send one or more signals to the database module 122 such that the portion of the video stream data is stored in the database 140. That is to say, the analysis module 121 can at least partially redefine and/or reconstruct the video stream from the individual frames (that were separated or deconstructed as described above).

In some instances, the host device 110 can receive video stream data (e.g., from the image capture system 160 and via the network 105 and the communication interface 125) and the analysis module 121 and/or any other suitable module not shown in FIG. 2, can perform one or more pre-processing and/or pre-sorting procedures prior to performing the facial recognition process (just described). For example, in some embodiments, the analysis module 121 (or other module) can analyze the video stream data to determine and/or define a data set including, for example, identifying information and/or contextual information such as location, time, event, etc. Once defined, the analysis module 121 can analyze user data stored in the database 140 (e.g., via sending a signal to the database module 122 indicative of an instruction to query the database 140 and/or the like) to determine if a portion of data associated with a user satisfies a criteria(ion) such as matching the data set including the contextual information associated with the video stream.

In some instances, the criteria(ion) can be associated with a confidence level and/or matching threshold, represented in any suitable manner (e.g., a value such as a decimal, a percentage, and/or the like). For example, in some instances, the criteria(ion) can be a threshold value or the like such as a 70% match of the video stream data and at least a portion of the data stored in the database, a 75% match of the video stream data and at least a portion of the data stored in the database, a 80% match of the video stream data and at least a portion of the data stored in the database, a 85% match of the video stream data and at least a portion of the data stored in the database, a 90% match of the video stream data and at least a portion of the data stored in the database, a 95% match of the video stream data and at least a portion of the data stored in the database, a 97.5% match of the video stream data and at least a portion of the data stored in the database, a 99% match of the video stream data and at least a portion of the data stored in the database, or any percentage therebetween.

In some instances, the data associated with the user can include, for example, calendar data, location data, preference data, and/or the like. If, for example, the data does not satisfy the criterion, the analysis module 121 can define an indication that the data associated with that user can be excluded from, for example, the facial recognition process. In this manner, the pre-processing and/or pre-sorting can reduce an amount of processing load or the like during the facial recognition process. Although described above as querying the database 140 for the user data, in some embodiments, the host device 110 can send a signal to a device associated with the user (e.g., the client device 150) indicative of a request for location data or the like associated with that device. Upon receipt of the location data (e.g., global positioning (GPS) data of the device) or the like, the analysis module 121 can determine if the location data matches the location data associated with the video stream, as described above.

By way of example, in some instances, analysis module 121 can receive video stream data from a sporting event that also includes location data associated with, for example, an arena. In response, the analysis module 121 can send a request for location data from a client device (e.g., the client device 150) associated with a user. If, for example, the location data associated with the video stream and the location data associated with the client device are substantially similar and/or the location data associated with the client device is within a predetermined range of location data values or the like, the analysis module 121 can increase a confidence score and/or otherwise consider the result as contributing to meeting the threshold and/or otherwise satisfying the criteria(ion). In some instances, the location data can be, for example, geo-location data based on a GPS, network location and/or data (e.g., via NFC verification, Bluetooth verification, cellular triangulation, cognitive network switching and/or protocols, etc.), social network data such as a "check-in", and/or the like. In this manner, the host device 110 (e.g., the analysis module 121) can determine, for example, a proximity of a client device to a location where the video stream data was captured.

Although described as analyzing location data, in other instances, the analysis module 121 can analyze data associated with any suitable source, activity, location, pattern, purchase, etc. For example, in some instances, the analysis module 121 can analyze ticket sales associated with a venue. In other instances, the analysis module 121 can analyze social media posts, comments, likes, etc. In some instances, the analysis module 121 can collect and/or analyze data associated with a user (as described above) and can define, for example, a user profile that can include, inter alia, user identification data, facial recognition data, client device data, purchase data, internet web browsing data, location data, social media data, preference data, etc. Thus, a user's profile data can be analyzed to determine a confidence score, value, and/or indicator, which can be evaluated relative to a threshold score, value, and/or indicator to determine if the user data and/or the video stream data satisfy the criteria (ion). Accordingly, in such embodiments, non-facial recognition data (e.g., ticket sales data, social media posts, wardrobe of an individual in a video or image, etc.) can be used to corroborate the facial recognition data and/or increase/decrease a confidence score.

Although the analysis module 121 is described above as analyzing the video stream data to define facial recognition data and contextual data associated with the video stream, in other embodiments, the facial recognition process and the contextual data process can be performed separately and/or independently. For example, in some embodiments, the analysis module 121 can be configured to perform the facial recognition process while a different module, processor, device, server, etc. can be configured to perform the contextual data process. Thus, a time to analyze the video stream data can be reduced and/or the processing load can be distributed when compared to the facial recognition process and the contextual data process being performed by the same module.

As described above, the database module 122 includes a set of instructions executed by the processor 120 (or portion thereof) that is associated with monitoring the database 140 and/or updating data stored therein. For example, the database module 122 can include instructions to cause the processor 120 to update data stored in the database 140 with at least a portion of the facial recognition data received from the analysis module 121. More specifically, the database module 122 can receive, for example, the initial data set associated with the user from the analysis module 121 and, in response, can store the initial data set in the database 140. In some instances, the database module 122 can receive a signal from the analysis module 121 indicative of a request to query the database 140 to determine if the data stored in the database 140 and associated with the initial data set for the user matches any suitable portion of the video stream data, as described above. If, for example, at least a portion of the video stream data satisfies a criteria(ion) (referred to henceforth as "criterion" for simplicity and not to the exclusion of multiple "criteria"), the database module 122 can be configured to update the data stored in the database 140 associated with that user. That is to say, if at least a portion of the video stream data matches the initial data set within a predetermined probability or the like. If, however, the video stream data does not match the initial data set stored in the database 140, the database module 122 can, for example, query the database 140 for the next entry (e.g., data associated with the next user) and/or can otherwise not update the database 140. Moreover, the database module 122 can be configured to store the data in the database 140 in a relational-based manner (e.g., the database 140 can be a relational database and/or the like) and/or in any other suitable manner.

The presentation module 123 includes a set of instructions executed by the processor 120 (or a portion thereof) that is associated with defining a contextual video stream and/or presentation representing at least a portion of the video stream data satisfying the criterion during the facial recognition process, as described above. More specifically, the presentation module 123 can be configured to define a contextual video stream and/or presentation representing an identified user (e.g., via facial recognition) at an event, venue, location, and/or the like. Once the contextual video stream (e.g., the user-specific contextual video stream) is defined, the presentation module 123 can send a signal associated with the user-specific contextual video stream to the communication interface 125, which in turn, can send a signal (e.g., via the network 105) to the client device 150 that is indicative of an instruction to graphically represent the contextual video stream on its display.

In some instances, the presentation module 123 can define a user-specific contextual video stream and/or presentation that is, for example, interactive and that can include any number of layers of data. For example, in some instances, the presentation module 123 can define an interactive and contextual video stream including any number of layers, levels, pages, etc. of data, each of which can include any suitable portion of contextual data associated with the video stream. In such instances, the contextual video stream can be graphically represented, for example, on the display of the client device 150 and the user can manipulate the client device 150 to select (e.g., via keyboard, mouse, touch screen, voice command, etc.), for example, an icon, a portion of the contextual video stream, and/or the like. In some instances, the selection of the icon or the like can be such that data associated with and/or related to that video stream (e.g., contextual data) is graphically represented on the display of the client device 150. For example, in some instances, the user-specific contextual video stream can represent the user at a sporting event and the contextual data can include, for example, data associated with a goal or other event coinciding with a portion of or time during the contextual video stream. As a specific example, a video stream (e.g., a contextual video stream) can represent a user cheering at a sporting event and the contextual data can include and/or can otherwise be associated with, for example, a video stream of the sporting event at a substantially coinciding time. In other instances, the contextual data can include a textual description of the coinciding event. In some instances, the contextual video stream and the contextual data can be presented on the display of the client device 150 substantially concurrently. For example, a user can view both a goal and their reaction to the goal simultaneously.

The user-specific contextual video stream defined by the presentation module 123 can be, for example, a complete video stream or a portion of the video stream received from the image capture system 160. For example, in some instances, the user-specific contextual video stream can be a portion of a video stream in which the user is present. Thus, if the user is present in substantially the entire video stream, the user-specific contextual video stream can be substantially the entire video stream. In other instances, if the user is present in only a portion of the video stream, then the defining of the user-specific contextual video stream can include extracting portions (e.g., frames) from the video stream in which the user is present. By way of example, if a 15 second video stream is captured and sent to the host device 110 but the user is only present in 3 seconds of the video stream, then the presentation module 123 can be configured to define a user-specific contextual video stream that is, for example, the 3 second portion in which the user is present.

Although the presentation module 123 and/or other portion of the host device 110 is described above as sending a signal to the client device 150 indicative of an instruction to present the user-specific contextual video stream on the display of the client device 150, in other instances, the presentation module 123 can define the user-specific contextual video stream and can send a signal to the database module 122 indicative of an instruction to store the user-specific contextual video stream in the database 140. In such instances, the data associated with the user-specific contextual video stream can be stored and/or otherwise associated with the user data stored in the database 140. In some instances, the host device 110 can retrieve the user-specific contextual video stream from the database 140 in response to a request from the client device 150 (and/or any other suitable device). More specifically, in some embodiments, the user can manipulate the client device 150 to access a webpage on the Internet. After being authenticated (e.g., entering credentials or the like) the user can interact with the webpage such that a request for access to the user-specific contextual video stream is sent from the client device 150 to the host device 110. Thus, the host device 110 (e.g., the database module 122) can retrieve the user-specific contextual video stream from the database 140 and can send a signal to the client device 150 operable in presenting the user-specific contextual video stream on the display (e.g., via the Internet and the webpage). In other words, the user-specific contextual video stream can be stored on the "cloud" and accessed via a web browser and the Internet.

Although the analysis module 121, the database module 122, and the presentation module 123 are described above as being stored and/or executed in the host device 110, in other embodiments, any of the modules can be stored and/or executed in, for example, the client device 150 and/or the image capture system 160. For example, in some embodiments, the client device 150 can include, define, and/or store a presentation module (e.g., as a native application). The presentation module can be substantially similar to or the same as the presentation module 123 of the host device 110. In such embodiments, the presentation module of the client device 150 can replace the function of the presentation module 123 otherwise included and/or executed in the host device 110. Thus, the presentation module of the client device 150 can receive, for example, a data set associated with a contextual video stream and upon receipt, can define a presentation to be presented on the display of the client device 150.

While the presentation module 123 is described above as defining the contextual video stream of and/or for the user of the client device 150 (e.g., a user-specific contextual video stream), in some instances, the presentation module 123 can be configured to define a user-specific contextual video stream associated with any user having a user profile stored in the database 140. For example, upon receipt of video stream data from the image capture system 160, the analysis module 121 can perform a facial recognition and/or video analysis process (as described above) to determine if facial data in the video stream matches facial data associated with a registered user (e.g., users whose user profile data and/or the like is stored in the database 140). In this manner, the presentation module 123 can be configured to define a user-specific contextual video stream for any suitable user or group of users if the facial recognition analysis performed by the analysis module 121 identifies the user's facial image in the video stream data (e.g., identifies a match and/or otherwise satisfies a criterion, as described in detail above). In some instances, the host device 110 can automatically send a user-specific contextual video stream to the client device associated with each identified user and/or can automatically upload and/or store the user-specific contextual video stream(s) on the "cloud" (e.g., in the database 140 and/or the like). In some instances, the user-specific video stream can be sent via e-mail, short message service (SMS), multimedia message service (MMS), NFC and/or Bluetooth communication, posted to a social media platform (e.g., posted to Facebook, Twitter, YouTube, Instagram, etc.), and/or the like. In some instances, the modality for sending the user-specific video stream can be based on a user preference such as a user preference for the receiving user and/or the sending user.

As described above, in some instances, the analysis module 121 and/or the like can perform one or more pre-processing and/or pre-sorting procedures prior to performing the facial recognition process. For example, the analysis module 121 can analyze data associated with any number of registered users (e.g., via sending a signal to the database module 122 indicative of an instruction to query the database 140 and/or the like) to determine if a portion of data associated with any of the users satisfies a criteria(ion) such as, for example, a match of contextual data associated with a user and contextual data associated with the video stream (e.g., location data associated with a user's client device matches location data associated with the video stream). After pre-processing the data stored in the database 140, the analysis module 121 can be configured to perform a facial recognition analysis to determine if facial image data in the video stream matches facial image data of a user identified via the pre-processing and/or the like.

In some instances, sharing of a contextual video stream can be based on a relationship between, for example, a user who captured the video stream data and a user requesting the contextual video stream data. For example, in some instances, a user of a client device (e.g., the client device 150) can capture a contextual video stream that can be analyzed and/or processed by the host device 110, as described in detail above. After defining the contextual video stream, a new user can register facial image data and user profile data, which in turn, is stored in the database. In some instances, the new user can be, for example, captured in the contextual video stream. Therefore, in some instances, the new user can establish, request, define, etc. a relationship, connection, link, association, and/or the like with the user that captured the contextual video stream. If the user that captured the video stream accepts the new user's request, a user-specific contextual video stream can be automatically sent to the client device of the new user and/or can otherwise be associated with the new user. In some instances, the user-specific video stream can be automatically made available to the new user (e.g., via an account, webpage, PC or mobile application, etc.).

In other instances, the host device 110 can be configured to suggest a relationship with one or more other users identified (e.g., via facial recognition) in a contextual video stream captured by a given user. In other words, the host device 110 can suggest associations based on identifying one or more users in a contextual video stream. In some instances, based on identifying an individual (e.g., a registered user or a non-registered user) via facial recognition, the host device 110 can determine the individual's proximity, location, and/or any other suitable contextual data. If the individual is a registered user, the host device 110 can, for example, suggest a relationship between the individual and the user who captured the video. If the individual is not a registered user, in some instances, the host device 110 can send a signal to a device associated with the individual with an invitation or the like to register with the system.

In some instances, for example, a first registered user may capture a video of a second registered user. As described herein, the host device 110 can be configured to analyze the video stream and define a user-specific video stream specific to the second registered user. In addition, the host device 110 can send data associated with the first registered user to the second registered user and vice versa. In some instances, the data can be personal identifying data such as a name. In other instances, the data can be a user profile picture sent without identifying the name of either user. In some instances, the host device 110 can also send data indicative of a suggestion to establish an association between the first registered user and the second registered user (e.g., suggest that the first registered user and the second registered user become associated, linked, or otherwise connected). For example, the second registered user can send an association request or the like to the first registered user and upon acceptance of the request, an association between the first registered user and the second registered user can be established. In other instances, the first registered user can send the request and the second registered user can accept the request. Moreover, data indicative of the association can be stored in the database 140.

In still other instances, a user can elect (e.g., via a user input at or on the client device 150) to limit or prevent sharing of the user's captured images and/or videos. For example, in some instances, the user of the client device 150 can capture a contextual video stream that is uploaded and/or sent to the host device 110 and stored, for example, in the database 140. In some instances, the user profile and/or user data stored in the database 140 can include an indication that the user's videos and/or images are private. In this manner, the host device 110 can identify one or more users (e.g., facial images) in the video stream but does not send user-specific contextual videos to those who were identified in accordance with the user profile data. While described as being private, in other instances, a user can elect to have his or her video streams and/or images shared with only a predetermined group of users identified in the video streams and/or images.

In some instances, the contextual data associated with a contextual video stream can include one or more digital tags and/or the like. For example, in some instances, the digital tag can be a title, a watermark, a hashtag, a date and/or time stamp, event or venue data, etc. Similarly, if the contextual video stream is a user-generated video, the user can define and/or otherwise input the one or more digital tags. In some instances, the host device 110 can be configured to include data representing the one or more digital tags when the presentation module 123 defines the user-specific contextual video stream. For example, in some instances, the host device 110 and/or the presentation module 123 can include and/or insert a title or the like in the user-specific contextual video stream. In other instances, the host device 110 and/or the presentation module 123 can include and/or can insert a watermark or the like that is configured to be graphically represented during playback of the user-specific contextual video stream. In some instances, such a watermark can be, for example, a title, a location, a caption, a reaction, etc. In other instances, such a watermark can be, for example, an advertisement or the like. For example, in some instances, a user and/or the host device 110 can elect a sponsor or the like of the user-specific contextual video stream. By way of example, a user can capture a contextual video stream while at a sporting event and can elect and/or can otherwise include data in the contextual video stream such that a watermark of a sporting goods company's logo (e.g., Nike® or the "Nike Swoosh"®) is displayed on or in a user-specific contextual video stream. In some instances, a user can earn rewards for electing to have a sponsor watermarked on and/or in their user-specific contextual video stream. Such rewards could be based on, for example, a number of views, likes, etc.

FIGS. 3-6 are example illustrations of various screen shots taken from an electronic device demonstrating the use of at least a portion of a facial recognition system (e.g., the system 100), according to an embodiment. Such a system can be used to present a contextual video stream of a user based at least in part on facial recognition data. At least a portion of the system 100 can be, for example, represented and/or described by a set of instructions or code stored in a memory and executed in a processor of an electronic device (e.g., a host device, a server or group of servers, a personal computer (PC), a network device, etc.) and/or the like. For example, in some embodiments, a host device can receive a signal associated with a request to register facial recognition data associated with a user and in response, can store the facial recognition data in a database. Similarly, the host device can receive a signal associated with video stream data. In some instances, one or more processors of the host device can then execute a set of instructions or code, stored in a memory of the host device, associated with analyzing the video stream data to determine if one or more images of the user are present in the video stream based at least in part on the facial recognition data. If images are found in the video stream data, the one or more processors can isolate an associated portion of the video stream data. Moreover, the one or more processors can execute a set of instructions or code to (1) associate contextual data such as time, location, event, etc. with video stream data and (2) define a contextual video stream of the user (e.g., user-specific contextual video stream). The one or more processors can then send, to a client device associated with the user, a signal indicative of an instruction to present the user-specific contextual video stream on a display of the client device.

As described above, at least a portion of the system 100 can be implemented in or on, for example, the client device 150. The client device 150 includes a display 155 (see e.g., FIG. 3) configured to graphically represent at least a portion of the system 100. The display 155 of the client device 150 can be, for example, a cathode ray tube (CRT) monitor, a liquid crystal display (LCD) monitor, a light emitting diode (LED) monitor, and/or the like that can graphically represent any suitable portion of the system 100 (e.g., a GUI associated with a webpage, PC application, mobile application, and/or the like). In some embodiments, the display 155 can be and/or can include a touch screen configured to receive a haptic user input. In some instances, the display 155 can be configured to graphically represent data associated with a facial recognition process and/or data associated with a video stream, as described in further detail herein.

Although not shown in FIGS. 3-6, the client device 150 can include a camera and/or other imaging device, as described above. For example, in some embodiments, such a camera can be integrated into the client device 150 (e.g., as in smartphones, tablets, laptops, etc.) and/or can be in communication with the client device 150 via a port or the like. More specifically, in this embodiment, the client device 150 can be a smartphone or tablet that includes a forward facing camera (e.g., the camera is pointed substantially in the same direction as the display 155). In this manner, the user can manipulate the client device 150 to cause the camera to capture an image (e.g., a photo) or a video. Moreover, in some instances, the display 155 can be configured to graphically represent data associated with an image captured by the camera. As such, a user can manipulate the client device 150 to take a picture or video of himself or herself via the camera while a field of view associated with the camera is presented on the display 155. In other words, the user can manipulate the client device 150 to take a selfie.

Figure 3:
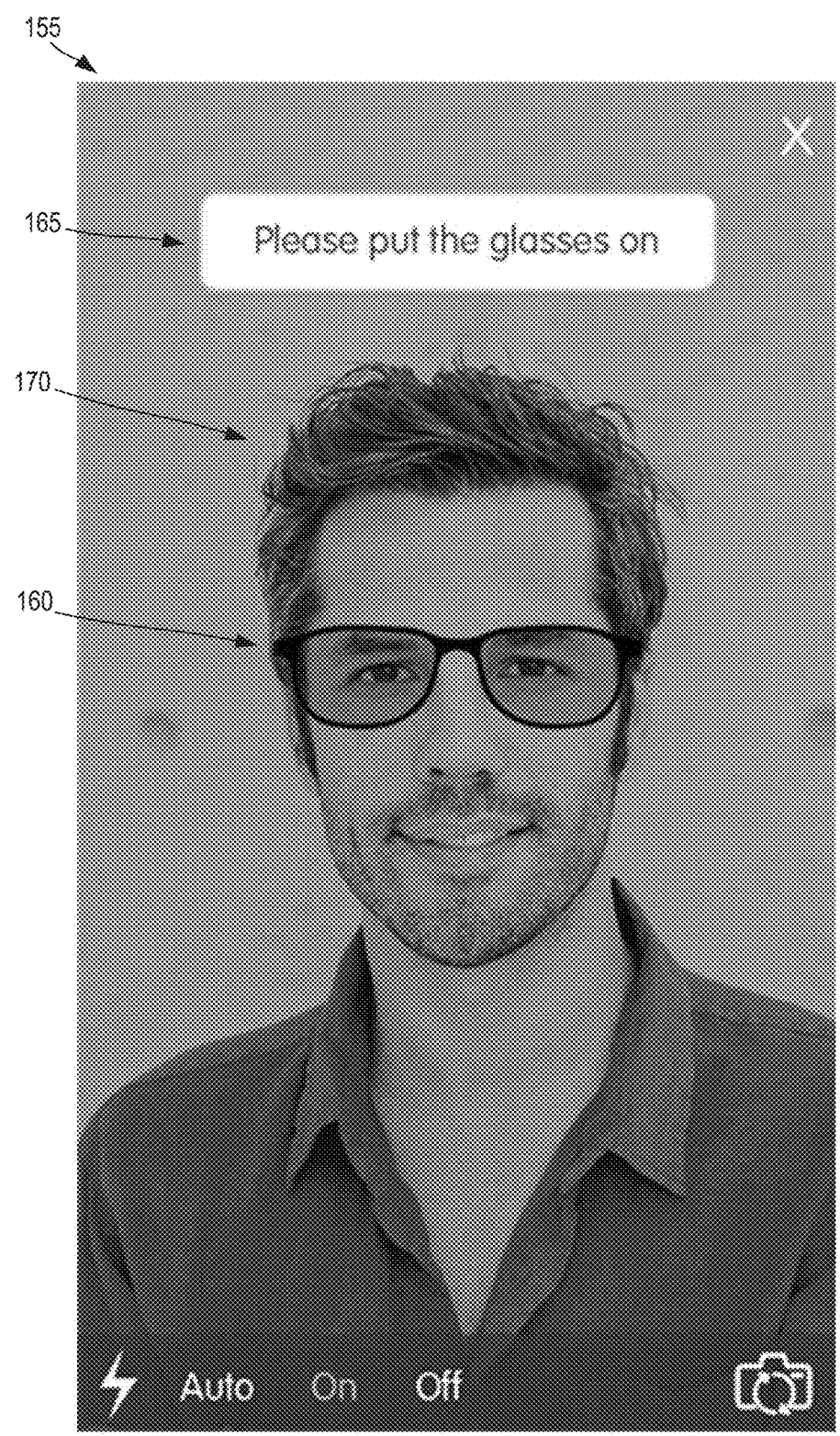
FIGS. 3-6 are example screen shots of a display of an electronic device demonstrating aspects of the recognition system of FIGS. 1A and/or 1B.

As described above, the camera of the client device 150 can capture an image of a user's face, which in turn, can be used to register facial recognition data associated with the user. Specifically, the user can manipulate the client device 150 by selecting, for example, a mobile application configured to control the camera. As such, the camera can receive image data, which in turn, can be presented on the display 155, as shown in FIGS. 3-6. In addition, the display 155 can be configured to graphically represent an indication, frame, boundary, guide, and/or any other suitable graphical representation of data, which can provide an indication associated with a desired alignment for the image of the user's face. Specifically, as shown in FIGS. 3-6, the display 155 can be configured to present eyeglasses 160 or the like, with which a user can then align his or her face. In addition, the display 155 can present a prompt 165 configured to instruct the user at any suitable point during a registration process. For example, as shown in FIG. 3, the prompt 165 includes text stating, "Please put the glasses on." In other words, the prompt 165 can instruct the user to align a facial image 170 with the graphically represented glasses 160 such that the user's eyes in the facial image 170 are positioned within the glasses 160 in a normal, natural, expected, and/or common manner (e.g., as if the user was physically wearing the glasses).

Once the user aligns his or her facial image 170 with the glasses 160, the camera can capture a desired image of the user's face. More specifically, in some embodiments, the graphically represented glasses 160 can have a desired size and/or shape that can result in an increased likelihood of a positive alignment and/or recognition. For example, in some instances, the graphic representation of the glasses 160 can be such that a distance between a user's eyes, when aligned with the graphically represented glasses 160 is greater than 65 pixels. In other instances, the distance between a user's eyes when aligned with the graphically represented glasses is between about 40 pixels and about 65 pixels. In other words, the alignment and/or verification of a user's facial image 170 can be at least partially based on a graphical representation of the user's eyes and, in some instances, a predetermined minimum distance can be associated with a greater likelihood of a positive alignment and/or recognition. In other embodiments, the alignment and/or verification of a user's facial image 170 can be at least partially based on any suitable facial feature, for example, relative to the graphically represented glasses 160 and/or any other graphically represented alignment indicator. Moreover, once the user's facial image 170 is aligned and/or otherwise verified, the camera can capture the desired image of the user's face. In some instances, the camera can capture the desired image of the user's face automatically once the user's facial image 170 is aligned. In other instances, an indication of the alignment can be graphically represented on the display, which is configured to prompt a user to take the picture (e.g., via a user input).

In some instances, the camera can automatically capture the desired image once the facial image 170 is aligned and/or verified. More specifically, in response to the mobile application identifying that the user's eyes are aligned with the graphic representation of the glasses 160, the mobile application can control the camera to capture the image without other involvement from the user. Thus, the user can take the image (e.g., a "selfie") without having to press a button on the mobile device and/or otherwise provide an image acquire indication to the mobile device.

Figure 4:
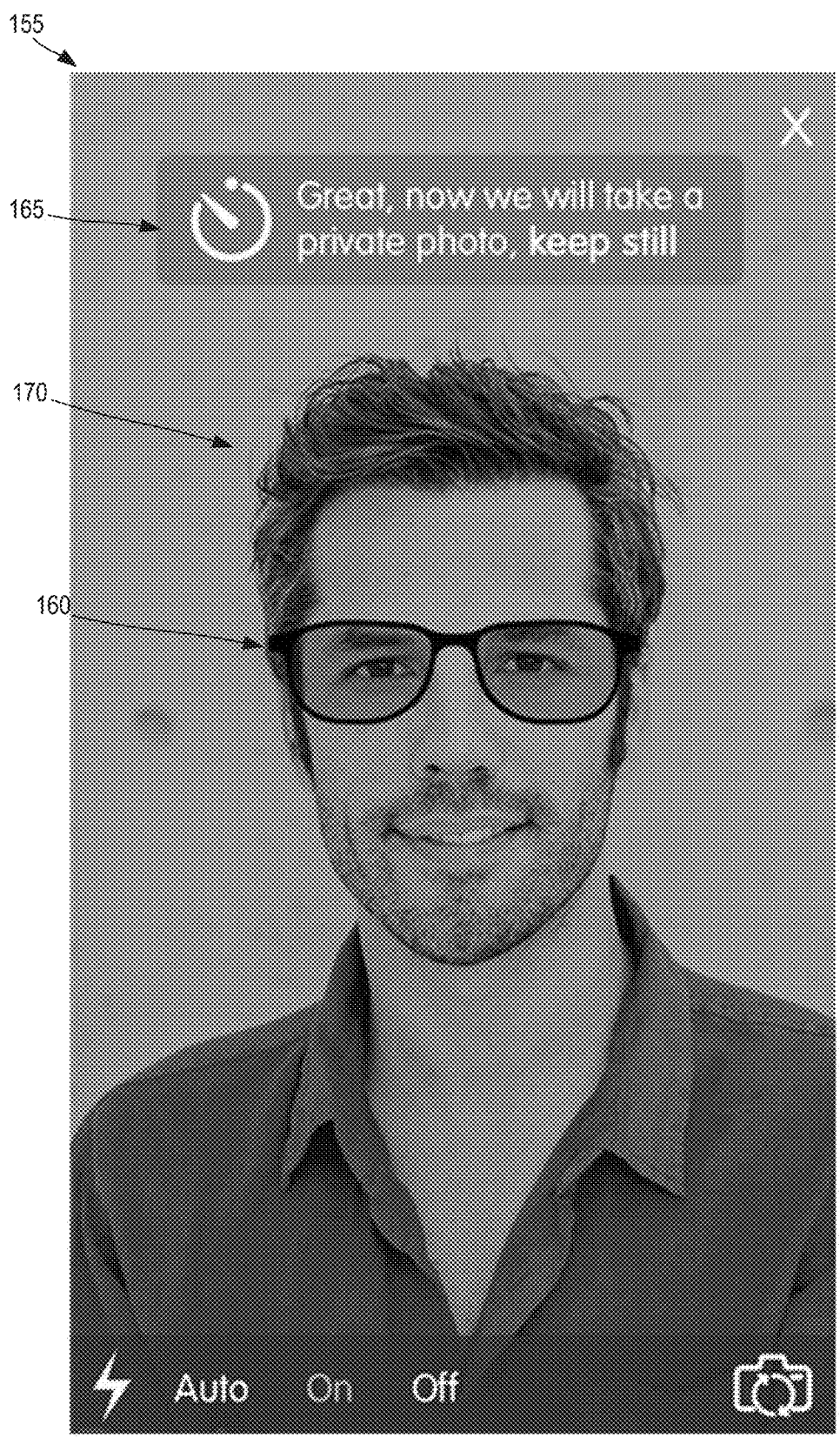
Figure 5:
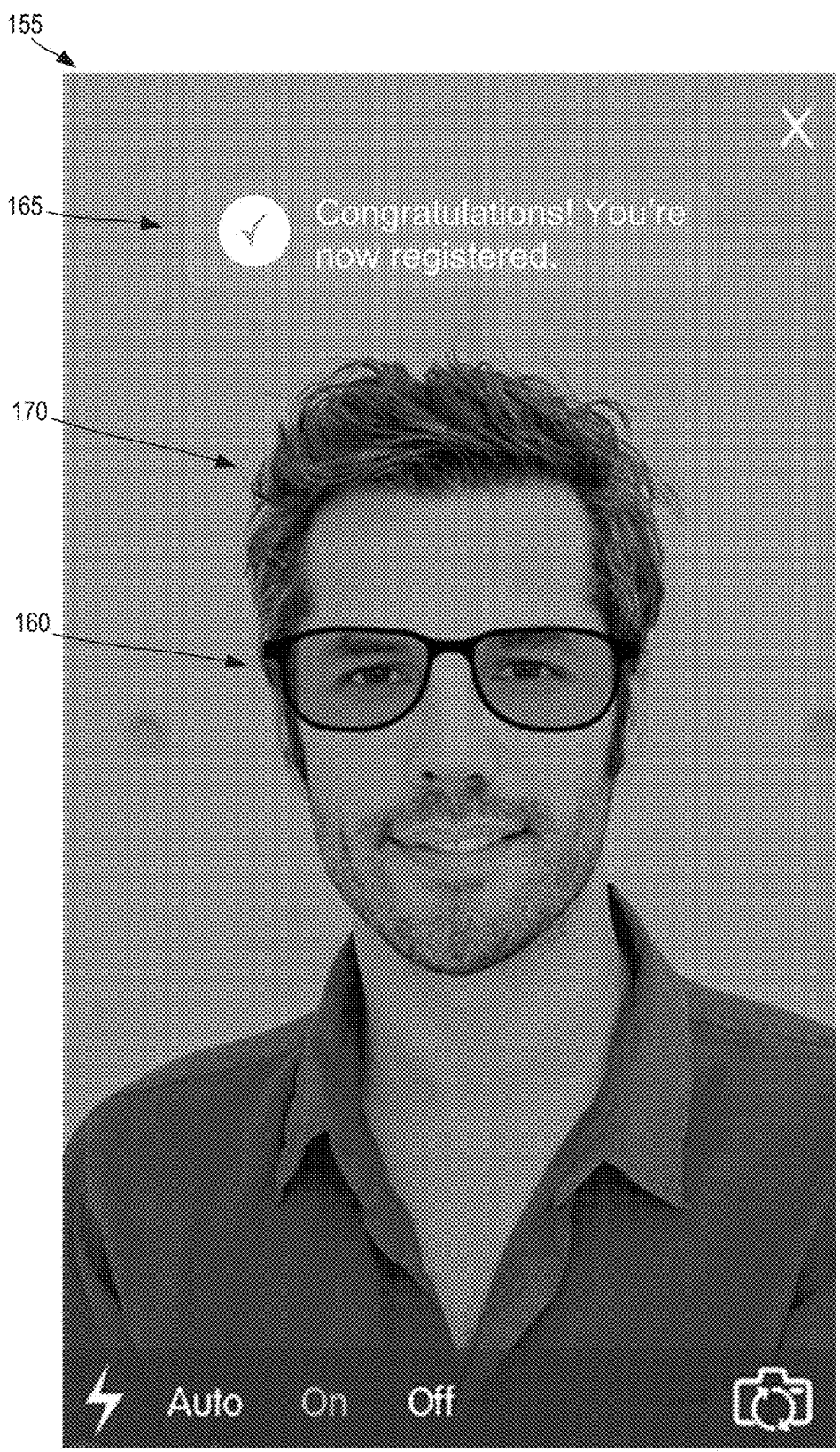

In addition, once the user aligns his or her facial image 170 with the glasses 160, the prompt 165 can be updated. For example, as shown in FIG. 4, the prompt 165 can include text stating, "Great, now we will take a private photo, keep still." Although not shown in FIGS. 3-6, in some embodiments, the prompt 165 can include a countdown timer or the like. For example, the prompt 165 can graphically represent a countdown associated with a length of time for taking and/or verifying the picture (e.g., a countdown such as "3"-"2"-"1"). Accordingly, the camera can capture the facial image 170 of the user and can send a signal associated with the facial image 170 to the processor of the client device 150 (described above). The processor can receive and/or retrieve data associated with the facial image 170 and, in turn, can execute a set of instructions or code (e.g., stored in the memory) associated with at least a portion of a facial recognition process. For example, in some instances, the processor can execute a set of instructions or code associated with verifying the alignment between the facial image 170 and the glasses 160 to determine if a facial image is present. In some instances, the processor can update the prompt 165 based on a successful verification of the facial image 170 in the captured picture or an unsuccessful verification of the facial image 170 in the captured picture. For example, if the processor affirmatively verifies the facial image 170, the prompt 165 can be updated to present the text, "Congratulations! You're now registered," as shown in FIG. 5. Alternatively, if the processor does not affirmatively verify the facial image 170, the prompt 165 can be updated to present the text, "We did not find a face, let's try again." That is to say, based on the alignment, the processor could not verify facial data. As such, the user can adjust the position of the facial image 170 relative to the glasses 160. Once the client device 150 verifies the alignment of the facial image 170 relative to the glasses 160, captures the facial image 170, and verifies the facial image 170 is successfully represented in the captured picture, the client device 150 can send a signal associated with the facial image data to the host device 110, which in turn, can perform any suitable facial recognition process (e.g., an initial registration process or the like), as described in detail above.

Figure 6:
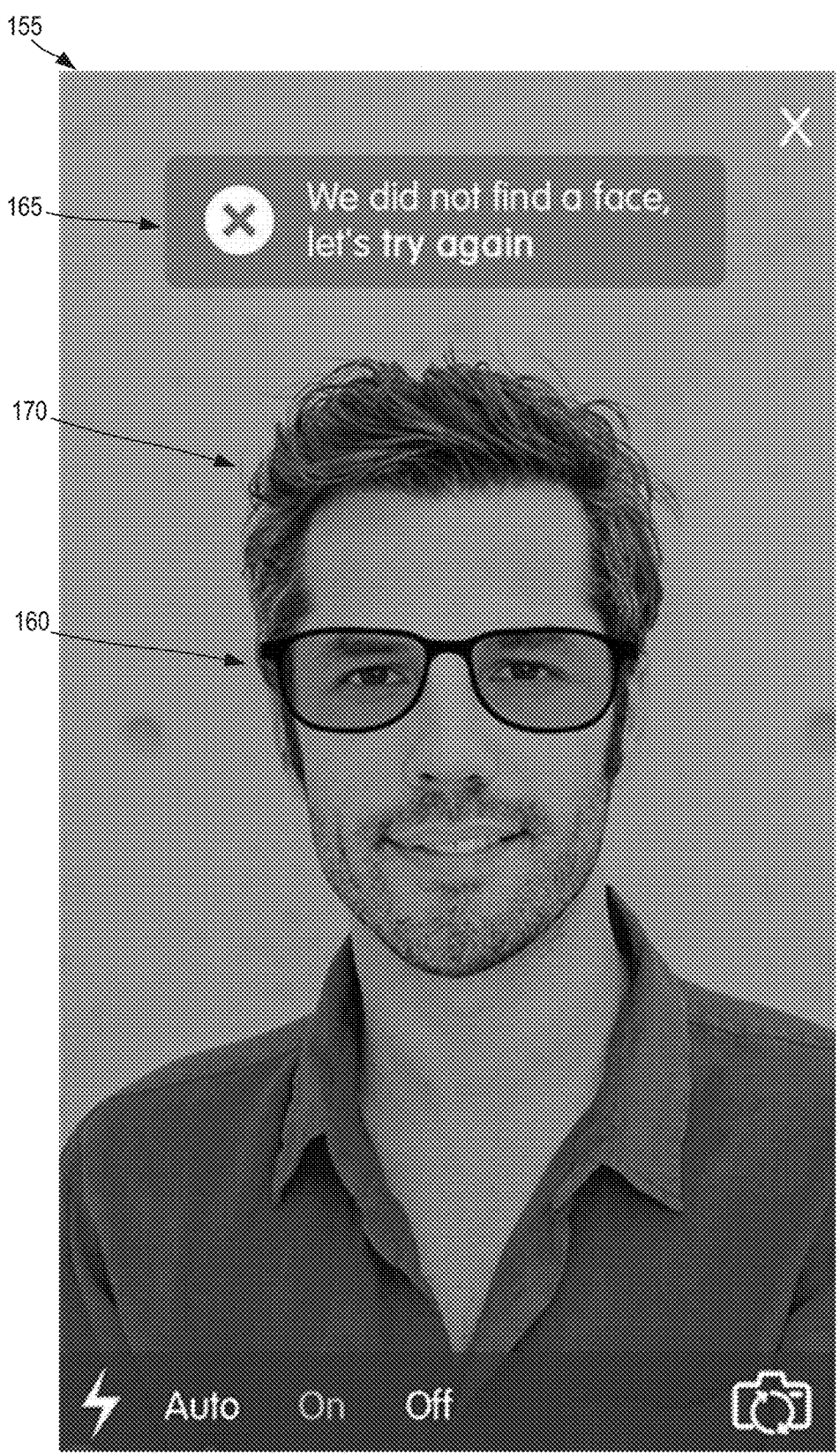

Although the facial registration process is particularly shown and described above with reference to FIGS. 3-6, in other embodiments, the client device 150 can verify and capture initial facial data of a user in any suitable manner. For example, while the prompts 165 are particularly shown and described above as including specific language, in other embodiments, the prompts 165 can be any suitable indicator with or without text. Similarly, the prompts 165 can include any suitable icon or symbol such as, for example, a stop watch (FIG. 4), a check mark (FIG. 5), or "X" (FIG. 6). In other embodiments, the prompts 165 can include only text, only icons or symbols, only colors, etc.

Similarly, while the display 155 is particularly shown and described above with reference to FIGS. 3-6 as including the glasses 160 used to align the facial image 170, in other embodiments, the client device 150 can be configured to present, on the display 155, any suitable indication, frame, boundary, facial feature, etc. For example, in some embodiments, the display 155 can graphically represent portions of the face such as, for example, eyes, ears, a nose, a mouth (e.g., smiling), a silhouette, etc. In other embodiments, the display 155 can graphically represent one or more shapes such as, for example, a circle, oval, square, rectangle, and/or any other polygonal or rounded shape. In still other embodiments, the display 155 can graphically represent one or more lines, arrows, ellipsis, and/or any other suitable symbol or shape. In yet other embodiments, the display 155 can present any other suitable graphical representation configured to facilitate alignment of the user's facial image 170 with the camera. Moreover, the verification of the facial image 170 can be based on any suitable facial feature such as, for example, a distance between the eyes (e.g., at least 65 pixels, as described above), a shape and/or size of the eyes, a color of the eyes, a size and/or shape of the nose, a nostril size and/or shape, a size and/or shape of the ears, a distance between the ears, a position and/or arrangement of the cheekbones, jaw or chin, a size and/or shape of a smile, a contour, shape, or path of the hairline, a color, style, thickness, or fullness of the hair, etc.

Figure 7:
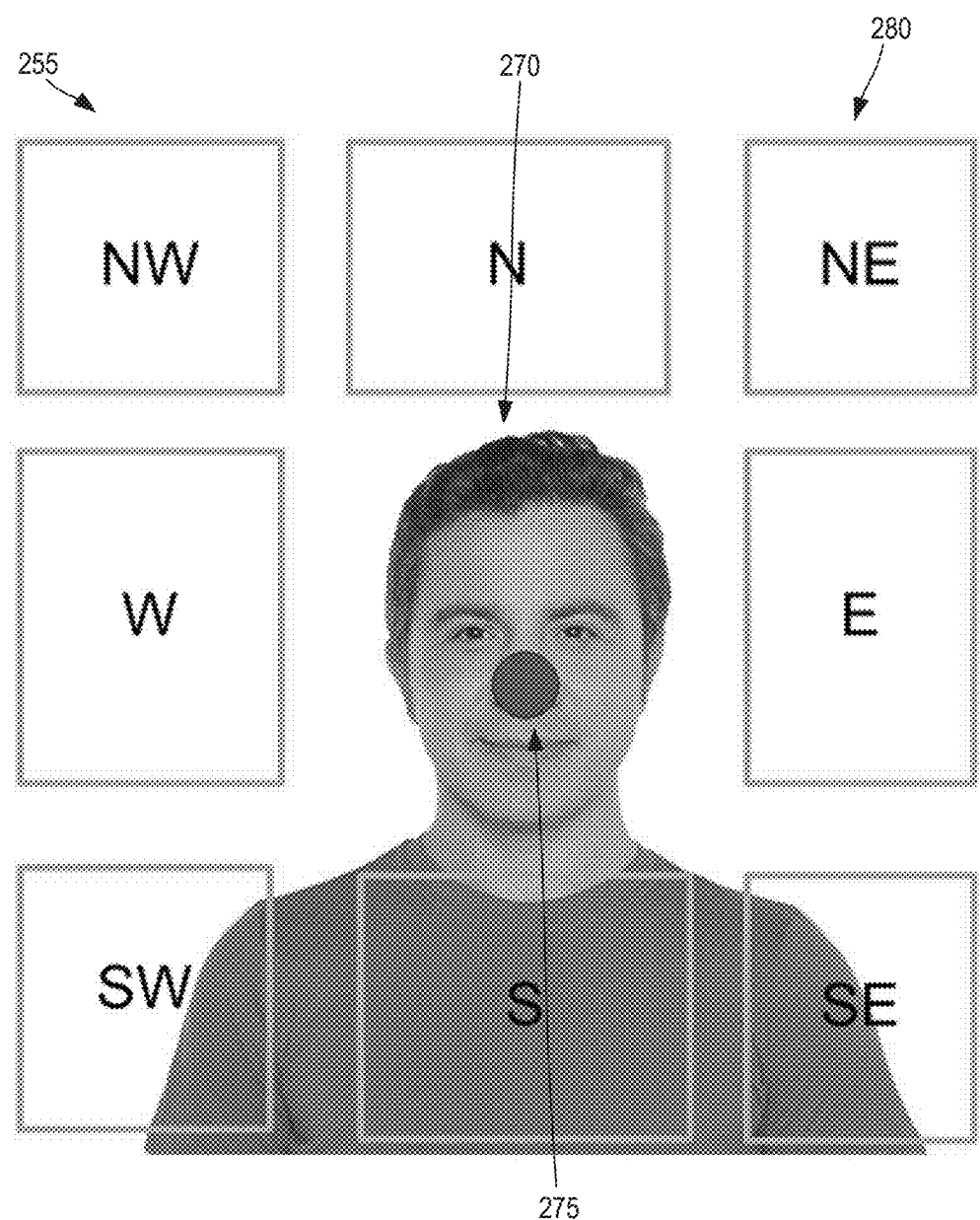
FIG. 7 is an example screen shot of a display of an electronic device demonstrating aspects of a recognition system according to another embodiment.

Although the client device 150 is described above as performing a particular alignment process to capture the desired image used for an initial registration of the facial image 170, in other embodiments, a client device can be configured to perform any suitable process configured to capture initial facial image data. For example, FIG. 7 is an example illustration of a screen shot taken from an electronic device demonstrating the use of at least a portion of a facial recognition system (e.g., the system 100), according to another embodiment. Such a system can be used to present a contextual video stream of a user based at least in part on facial recognition data, as described in detail above.

As described above, at least a portion of the system 100 can be implemented in or on, for example, a client device. The client device can be substantially similar to or the same as the client device 150 described above. Thus, portions of the client device are not described in further detail herein. As shown in FIG. 7, the client device includes a display 255 configured to graphically represent at least a portion of the system 100. The display 255 can be any suitable display such as those described herein. Accordingly, the display 255 can be configured to graphically represent data associated with a facial recognition process and/or data associated with a video stream, as described in further detail herein. Moreover, in this embodiment, the client device can be a smartphone or tablet with a forward facing camera, as described in detail above.

As described above, the camera of the client device can capture an image of a user's face, which in turn, can be used to register facial recognition data associated with the user. Specifically, the user can manipulate the client device by selecting, for example, a mobile application configured to control the camera. As such, the camera can receive image data, which in turn, can be presented on the display 255, as shown in FIG. 7. In addition, the display 255 can be configured to graphically represent one or more indications, frames, boundaries, guides, and/or any other suitable graphical representations of data, which can provide an indication associated with a desired alignment for the user's facial image. Specifically, in this embodiment, the display 255 can be configured to graphically represent a dynamic indicator 275 and a set of sector indicators 280, which can be used to align a user's facial image 270 relative to the camera and/or display 255.

For example, in some instances, the user can manipulate the client device and/or can move his or her head relative to the client device such that the dynamic indicator 275 is aligned with substantially the center of the user's facial image 270. While the dynamic indicator 275 is shown in FIG. 7 as being a shaded circle, in other instances, the dynamic indicator 275 can be any suitable shape and/or size, and can be either shaded or not shaded. Similarly, while the sector indicators 280 are shown as being rectangular, in other embodiments, the sector indicator 280 can be any suitable shape, size, or configuration. In some instances, once the user's facial image 270 is aligned in a desired position and/or orientation, the client device can automatically capture the facial image 270. For example, when the dynamic indicator 275 is disposed substantially in the center of the display 255, the camera can capture, for example, a front view of the facial image 270 (e.g., substantially straight forward or the like).

With the front view of the facial image 270 captured, the user can then move his or her head relative to the display 255, which in turn, moves the dynamic indicator 275 in a substantially similar manner. For example, in some instances, a user can tilt his or head back as if looking upward. As such, the client device can determine the movement of the user's facial image 270 and can move the dynamic indicator 275 in an associated manner. In some instances, the movement of the user's facial image 270 can place the dynamic indicator 275, for example, in a boundary defined by an associated sector indicator 280 such as, for example, the sector indicator 280 labeled "N" for "North." Moreover, once the dynamic indicator 275 is placed in a desired position within the boundary of the sector indicator 280, the camera can automatically capture the facial image 270 associated with, for example, looking or tilting upward. In some instances, once a successful facial image 270 is captured for the associated sector indicator 280, the display 255 can be configured to change and/or update a color of any portion of the sector indicator 280 and/or otherwise update the associated sector indicator 280 to provide an indication to the user that the facial image 270 for that sector was successfully captured.

Once the facial image 270 is successfully captured for that sector indicator 280, the user can move his or her head relative to the camera and/or display 255 to place the dynamic indicator 275 in a desired position within each sector indicator 280 in substantially the same manner as described above. In other words, the user can move his or her head and/or facial image 270 such that the dynamic indicator 275 is moved through a desired position within the sector indicator 280 labeled "NE" for "Northeast," the sector indicator 280 labeled "E" for "East," the sector indicator 280 labeled "SE" for "Southeast," the sector indicator 280 labeled "S" for "South," the sector indicator 280 labeled "SW" for "Southwest," the sector indicator 280 labeled "W" for "W," and the sector indicator 280 labeled "NW" for "Northwest." Thus, the client device can be configured to capture nine facial images 270 of the user (a front view, a left view, a right view, a top view, a bottom view, a top-left view, a top-right view, a bottom left view, and a bottom right view), which in turn, can be used to define an initial data set and/or to register facial recognition data, as described in detail above. In other words, the client device can capture multiple views of the user (e.g., front, side, top, bottom, etc.) and is not limited to, for example, a front view. In some instance, capturing the multiple facial images 270 associated with the sector indicators 280 can facilitate a facial recognition process, for example, when the facial image in a video stream is not a front view of the facial image. In some instances, capturing the multiple views of the facial image 270 can increase efficiency and/or accuracy of a facial recognition process when compared to using a single view (e.g., front view of the facial image 270). Accordingly, if a video stream of an event captures only a side-view of a user's face, the user can be more readily identified based on the multiple facial images used to register the user.

Although the display 255 is shown and described as graphically representing the set of sector indicators 280 in a particular arrangement, in other embodiments, the display 255 can graphically represent any suitable indicator or set of indicators in any suitable arrangement. By way of example, while the sector indicators 280 are shown and described as having labels associated with coordinates (e.g., "N" for "North," etc.), in other embodiments, the second indicators 280 can have any suitable label. In some embodiments, for example, such labels can be numbers, letters, symbols, shapes, and/or any other suitable label. Moreover, while described above as moving the dynamic indicator 275, in response to movement of the facial image 270, through the sector indicators 280 in a specific manner, the dynamic indicator 275 can be moved through the sector indicators 280 in any suitable manner and/or in no particular order. While the display 255 is shown as graphically representing eight sector indicators 280, in other embodiments, the display 255 can graphically represent any suitable number of sector indicators such as, for example, two sector indicators, three sector indicators, four sector indicators, five sector indicators, six sector indicators, seven sector indicators, nine sector indicators, ten sector indicators, eleven sector indicators, twelve sector indicators, thirteen sector indicators, fourteen sector indicators, fifteen sector indicators, twenty sector indicators, thirty sector indicators, or any number therebetween. In still other embodiments, the display 255 can graphically represent more than thirty sector indicators.

Figure 8:
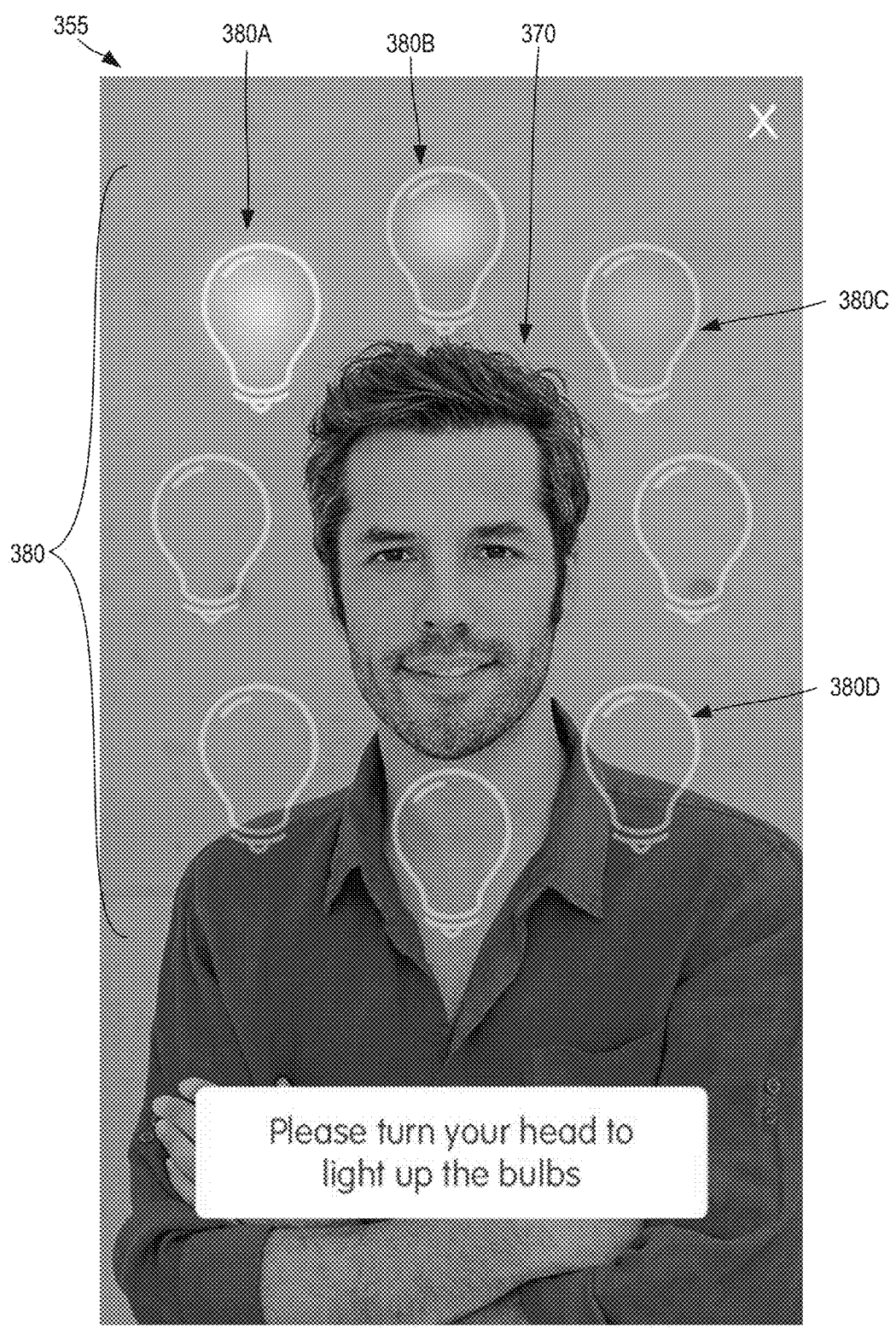
FIG. 8 is an example screen shot of a display of an electronic device demonstrating aspects of a recognition system according to another embodiment.

FIG. 8 is an example illustration of a screen shot taken from an electronic device demonstrating the use of at least a portion of a facial recognition system (e.g., the system 100 of FIG. 1A and/or FIG. 1B), according to another embodiment. Such a system can be used to present a contextual video stream of a user based at least in part on facial recognition data, as described in detail above. As described above, at least a portion of the system 100 can be implemented in or on, for example, a client device. The client device can be substantially similar to or the same as the client device 150 described above with respect to FIGS. 1A and/or 1B. Thus, portions of the client device are not described in further detail herein.

As shown in FIG. 8, the client device includes a display 355 configured to graphically represent at least a portion of the system 100. The display 355 can be any suitable display such as those described herein (e.g., similar to or the same as the display 255 described above with reference to FIG. 7). Accordingly, the display 355 can be configured to graphically represent data associated with a facial recognition process and/or data associated with a video stream, as described in further detail herein.

As described above, the client device includes a camera that can capture an image of a user's face, which in turn, can be used to register facial recognition data associated with the user. Specifically, the user can manipulate the client device by selecting, for example, a mobile application configured to control the camera. As such, the camera can receive image data, which in turn, can be presented on the display 355, as shown in FIG. 8. In addition, the display 355 can be configured to graphically represent one or more indications, frames, boundaries, guides, and/or any other suitable graphical representations of data, which can provide an indication associated with a desired alignment for the user's facial image. Specifically, in the embodiment shown in FIG. 8, the display 355 can be configured to graphically represent a set of sector indicators 380A, 380B, 380C, and 380D (collectively referred to as "sector indicators 380"), which can be used to align a user's facial image 370 relative to the camera and/or display 355. As shown in FIG. 8, in this embodiment, the sector indicators 380 are graphically represented on the display 355 as eight light bulbs arranged in an oval or circle. In other embodiments, a display can graphically represent any suitable sector indicators, which can be arranged in any suitable manner. For example, in some embodiments, the sector indicators 380 can be graphically represented on the display 355 as eight light bulbs (as shown in FIG. 8), which are arranged in a square or rectangular manner (e.g., similar to the sector indicators 280 shown in FIG. 7). In other embodiments, the sector indicators 380 can be arranged substantially randomly. Although the sector indicators 380 are shown as being substantially similar to each other, in other embodiments, the display 355 can graphically represent any number of sector indicators 380 with a size, shape, orientation, and/or configuration of at least one status indicator being different from a size, shape, orientation, and/or configuration of at least one other status indicator.

In some instances, the user can manipulate the client device and/or can move his or her head relative to the client device such that the user's facial image 370 is substantially aligned with a center of the display. Although not shown in FIG. 8, in some embodiments, the display 355 can be configured to graphically represent a dynamic indicator such as the dynamic indicator 275 described above with reference to FIG. 7. In other embodiments, the display 355 need not graphically represent the dynamic indicator. In some instances, once the user's facial image 370 is aligned in a desired position and/or orientation relative to the display 355 (and/or camera capturing the image of the user's facial image 370), the client device can capture the facial image 370. For example, when the user's facial image 370 is disposed substantially in the center of the display 355, the camera can capture, for example, a front view of the facial image 370 (e.g., substantially straight forward or the like). In other words, in some instances, the camera can be configured to capture the user's facial image 370, when the facial image 370 is in a position with a relatively small amount of deviation or no deviation from a frontal position. In some embodiments, the camera can be configured to automatically capture the image once the user's facial image is in the desired position relative to the display 355.

With the front view of the facial image 370 captured, the user can then move his or her head relative to the display 355, which in turn, moves the user's facial image 370 relative to the display 355. For example, in some instances, a user can tilt his or her head back and to the right as if looking toward an upper left corner of the display 355 (e.g., opposite the tilt of the user's head because the display 355 is facing in an opposite direction). As such, the client device can determine the movement of the user's facial image 370 and in some instances, the movement of the user's facial image 370 can be associated with a given sector indicator 380. More specifically, in some instances, a user can move his or her head relative to the display 355 to a position, orientation, etc. associated with the status indicator 380A. In some instances, the client device can determine and/or calculate a position and/or orientation of the user's facial image 370 graphically represented on the display 355. For example, the client device can determine the user's facial image 370 is in a position and/or orientation associated with the sector indicator 380A. As such, the client device can be configured to send a signal indicative of the alignment to the display 355, which in this embodiment, can be graphically represented on the display 355 as lighting the light bulb 380A (status indicator 380A).

Once the client device determines the user's facial image 370 is in the desired position relative to the status indicator 380A (graphically represented as the fully lit lightbulb), the client device can send a signal to the user's facial image 370. In some embodiments, the client device can cause the camera to automatically capture the user's facial image 370 once in the desired position and/or orientation. In other embodiments, the user can manipulate the client device to cause the camera to capture the user's facial image 370.

In some instances, the user can move his or her head relative to the display (as just described) to a position and/or orientation associated with each status indicator 380. Thus, the client device can capture, for example, a frontal view of the user's facial image 370 and an angular view of the user's facial image 370 associated with and/or otherwise for each of the status indicators 380. As described above with reference to the client device shown in FIG. 7, the client device can be configured to send a signal associated with the captured images to a host device such as the host device 110 described above with respect to FIGS. 1A and/or 1B.

As shown in FIG. 8, the client device can be configured to graphically represent the status indicators 380 on the display 355 in at least one indicator state. In other words, the client device can be configured to graphically represent a qualitative indication on the display 355 associated with an alignment of the facial image 370 relative to a given status indicator 380. For example, as described above, the status indicator 380A is graphically represented as a substantially lit lightbulb when the user's facial image 370 is in a desired position relative to the status indicator 380A. As shown in FIG. 8, however, any one of the status indicators 380 can be configured to indicate a partial alignment of the user's facial image 370 relative to that status indicator 380. For example, the status indicator 380C is graphically represented on the display 355 as a partially lit light bulb that is less bright, full, and/or lit than the status indicator 380B (graphically represented on the display 355 as a partially lit light bulb), which in turn, is less bright, full, and/or lit than the status indicator 380A (graphically represented on the display 355 as a substantially lit light bulb).

In this manner, the substantially lit light bulb associated with the status indicator 380A can represent an alignment of the user's facial image 370 relative to the status indicator 380A within a first tolerance; the partially lit light bulb associated with the status indicator 380B can represent an alignment outside of the first tolerance but within a second tolerance; and the partially lit light bulb associated with the status indicator 380C can represent an alignment outside of the second tolerance but within a third tolerance. Moreover, as shown in FIG. 8, the substantially unlit light bulb associated with the status indicator 380D can represent an alignment (or lack of alignment) outside of the third tolerance. In other words, the status indicator 380D can be associated with a first level of indication (e.g., "off"), the status indicator 380C can be associated with a second level of indication (e.g., "level-one on"), the status indicator 380B can be associated with a third level of indication (e.g., "level-two on"), and the status indicator 380A can be associated with a fourth level of indication (e.g., "level-three on"). In some instances, the client device can automatically send a signal to the camera to cause the camera to capture the user's facial image 370 when the user's facial image 370 is within a predetermined tolerance (e.g., the first tolerance) associated with an orientation and/or position relative to a given status indicator 380 (e.g., the status indicator 380A). That is to say, the client device can cause the camera to capture the user's facial image 370 when the facial image 370, relative to at least one status indicator 380, satisfies a criterion.

While the status indicators 380 are described above as indicating an alignment of the user's facial image 370 with a predetermined alignment and/or within a predetermined tolerance and presenting a qualitative indication thereof, in other embodiments, a display can include one or more status indicators configured to indicate any suitable characteristic associated with a facial image and/or video stream. For example, in some embodiments, a status indicator can be substantially similar to the status indicators 380 illustrated in FIG. 8 and configured to provide a qualitative indication to a user indicative of a suitability of an image or video stream. For example, in some embodiments, such a suitability can be an alignment of an image and/or video stream (as described above with respect to FIG. 8), a clarity of an image and/or video stream, a focus of an image and/or video stream, a movement associated with an image and/or video stream through a predetermined range of motion, a measure of time associated with an image and/or video stream being in a field of view of a camera, and/or any other measure of suitability. For example, the bright "light" of the status indicator 380A can indicate that a suitable video and/or image has been captured for the head position associated with status indicator 380A. For another example, the medium "light" in the status indicator 380B can indicate that a less than suitable video and/or image has been captured for the head position associated with status indicator 380B. For yet another example, the lack of "light" in the status indicator 380D can indicate that no image has been captured for the head position associated with the status indicator 380D. In such embodiments, fully "lit" status indicators 380 can indicate that the camera has captured sufficient video and/or image of the various positions of the user. This can provide an indication to the user that the video and/or images are sufficient. In other embodiments, any other suitable indicator can be used to indicate the suitability of an image captured of a user's facial position and/or alignment. In some instances, a client device can automatically capture an image and/or video stream of the user's facial image when the facial image is suitable and/or when the facial image is within a predetermined tolerance associated with an alignment of the facial image.

Although the client device is described above as sending the facial image data to the host device after the user's facial image 370 has satisfied a criterion associated with each status indicator 380, in other instances, a client device can send the facial image data when the user's facial image 370 does not satisfy the criterion associated with at least one status indicator 380. In such instances, the client device (e.g., a processor included therein) can define a first criterion associated with the user's facial image 370 being in a predetermined alignment and/or having a predetermined suitability relative to each status indicator 380 and a second criterion associated with a predetermined number of status indicators 380 that satisfy its associated first criterion. In other words, the client device can determine that facial image data satisfies the second criterion when a predetermined number of status indicators out of the set of status indicators 380 satisfy their associated first criterion (e.g., any suitable percentage or portion of any suitable number of status indicators).

Figure 9:
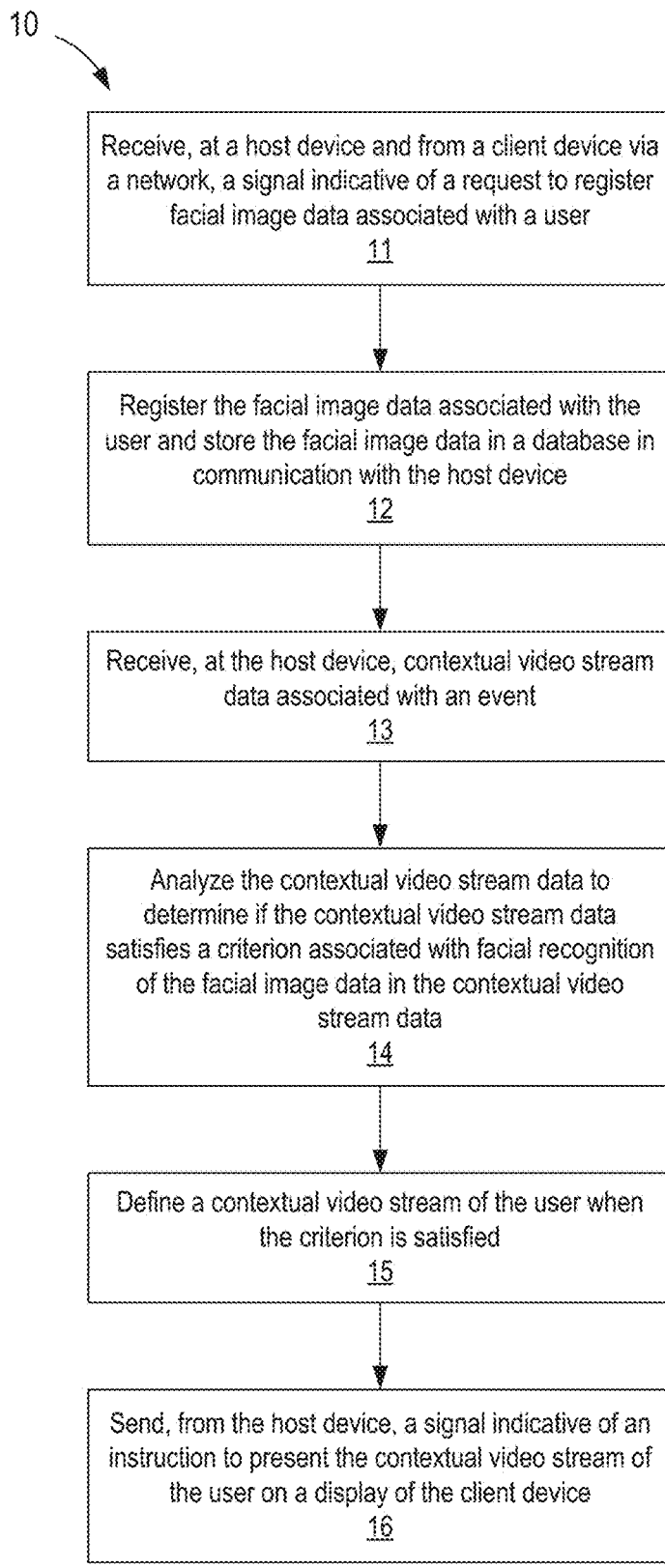
FIG. 9 is a flowchart illustrating a method of using a video recognition system according to an embodiment.

FIG. 9 is a flowchart illustrating a method 10 of defining a contextual video stream according to an embodiment. The method 10 includes receiving, at a host device and from a client device via a network, a signal indicative of a request to register facial image data associated with a user, at 11. For example, in some embodiments, the network can be any suitable network or combination of networks such as, for example, the network 105 described above with reference to FIGS. 1A and/or 1B. The host device can be substantially similar to or the same as the host device 110 described above with reference to FIGS. 1 and 2. Similarly, the client device can be substantially similar to or the same as the client device 150 described above with reference to FIGS. 1-6. In some instances, the client device can be configured to capture initial facial image data and can send the initial facial image data to the host device. Specifically, in some embodiments, the client device can be configured to capture a user's facial image or images in any suitable manner such as, for example, those described above with reference to FIGS. 2-6, with reference to FIG. 7, and/or with reference to FIG. 8. Accordingly, the host device can receive facial image data from the client device and can perform any suitable process or the like associated with registering a user and/or the user's facial image data.

The method 10 includes registering the facial recognition data associated with the user and storing the facial recognition data in a database in communication with the host device, at 12. The database can be any suitable database such as, for example, the database 140 described above with reference to FIGS. 1 and/or 1B. The registering of the facial recognition data can include any suitable process, method, and/or algorithm associated with facial recognition such as those described above. In some instances, the host device can be configured to define an initial data set or the like based on the facial recognition and can store at least a portion of the initial data set in the database.

The host device receives contextual video stream data associated with an event, at 13. The host device can receive the contextual video stream data from an image capture system such as the image capture system 160 described above with reference to FIGS. 1A and/or 1B. More specifically, the host device can receive the contextual video stream data either directly (e.g., from one or more cameras via the network) or indirectly (e.g., from a computing device via the network, which in turn, is in communication with the one or more cameras).

The contextual video stream data is analyzed to determine if the contextual video stream data satisfies a criterion associated with facial recognition of the facial image data in the contextual video stream data, at 14. For example, the host device can receive the contextual video stream data (or image data, for example, from a photograph) and can analyze and/or process the contextual video stream data to determine if a portion of the contextual video stream data matches any suitable portion of the facial image data. That is to say, the host device can use the facial image data as a template against which data included in the contextual video stream is compared. Said another way, the host device performs a facial recognition process and/or analysis on the contextual video stream data based at least in part on the facial image data. In some instances, the criterion can be, for example, associated with a matching of the contextual video stream data with the facial image data with a predetermined and/or acceptable probability. In some embodiments, the host device can be configured to analyze and/or process the contextual video stream data based at least in part on separating, parsing, sorting, and/or otherwise deconstructing the contextual video stream data into its individual frames (e.g., a static image at a predetermined time during the video stream). As such, the host device can compare and/or analyze data included in the contextual video stream frame relative to the facial image data.

In some instances, the analysis of the contextual video stream data also includes analyzing the contextual video stream data to determine contextual information associated with the video stream such as, for example, location, venue, time, coinciding event (e.g., a sports team scoring a goal, being captured, for example, on a "kiss cam," etc.), and/or any other suitable contextual information. In some instances, the host device can be configured to match, aggregate, and/or otherwise associate at least a portion of the video stream to the contextual data. For example, in some instances, the video stream data can represent, for example, a user at a sporting event. In such instances, the contextual data can be, for example, a video stream of the sporting event or game, and can include data associated with a time, location, venue, teams, etc. As such, the host device can be configured to aggregate the video stream data and the contextual data such that the video stream data and the contextual data substantially coincide (e.g., occur and/or capture data associated with substantially the same time). In other instances, the contextual data can include data associated with any other suitable context.

A user-specific contextual video stream is defined when the criterion associated with facial recognition of the facial image data in the contextual video stream data is satisfied, at 15. For example, when the host device determines that at least a portion of the data in the contextual video stream satisfies a criterion (e.g., matches the facial image data to a predetermined and/or acceptable probability), the host device can define the contextual video stream of the user and can store the contextual video stream of the user in the database. With the contextual video stream of the user defined (i.e., the user-specific contextual video stream), the host device sends a signal indicative of an instruction to present the contextual video stream of the user on a display of the client device, at 16. For example, in some embodiments, the host device can send a signal to the client device, via the network, that is operable in presenting the user-specific contextual video stream on the display of the client device. In other embodiments, the host device can store the user-specific contextual video stream (e.g., in the database or the like) and can be configured to retrieve the user-specific contextual video stream from the database in response to a request from the client device (and/or any other suitable device). More specifically, in some embodiments, the user can manipulate the client device to access a webpage on the Internet. After being authenticated (e.g., entering credentials or the like) the user can interact with the webpage such that a request for access to the contextual video stream is sent from the client device to the host device. Thus, the host device can retrieve the contextual video stream from the database and can send a signal to the client device operable in presenting the contextual video stream on the display (e.g., via the Internet and the webpage). In other words, the contextual video stream can be stored on the "cloud" and accessed via a web browser and the Internet.

While the method 10 is described above as sending and/or receiving video streams, image data, contextual data, etc. and presenting and/or sharing user-specific video streams and/or image data with one or more users, it should be understood that a system can be arranged such that video stream data and/or image data can be captured in any suitable manner, analyzed by any suitable device, and sent to and/or shared with any suitable user or user device. By way of example, in some instances, a user can manipulate a user device (e.g., client device such as the client device 150) to capture a facial image of the user. For example, the user can open a mobile application (e.g., when the user or client device is a smartphone or other mobile or wearable electronic device) and can capture a facial image (e.g., a "selfie") via a camera of the client device. In other words, the user can control the camera of the client device via the application to capture a selfie.

The facial image can be analyzed via facial recognition and/or any other suitable image analysis either by the client device and/or by a host device. Once analyzed, data associated with the user (e.g., facial image data and/or contextual or user profile data) can be registered and stored, for example, in a database (e.g., the database 140) and/or any other suitable data storage (e.g., a memory of the client device or the like). As such, the user can be "registered" with the system (i.e., the user is a registered user).

In some instances, the registered user can capture content (e.g., image data and/or a video stream) via the application. As described above, the content can be a video stream of one or more people in a given context such as, for example, one or more people at a sporting event or the like. In some instances, the user captured (e.g., generated) content can be associated with contextual data such as a time, date, location, venue, event, etc. and/or can otherwise be tagged with data and/or metadata. In other instances, the user generated content need not be associated with contextual data. The user generated content (e.g., video stream data or the like) can be analyzed via facial recognition and/or other image analysis via the client device or a host device to determine the presence of any registered user (as described above). If a registered user is identified in the video stream, the user, the client device, and/or the host device can define a user-specific video stream associated with one or more of the identified users. The user, the client device, and/or the host device can then determine whether to share the user-specific video stream with each identified user. In some instances, the sharing of the user-specific video stream(s) can be automatic based on a user-profile and/or preference and/or based on a setting or the like within the mobile application or account. In other instances, the sharing of the user-specific video stream(s) can be based on a manual or other input from the user (e.g., based on a selection or the like). In still other instances, the sharing of the user-specific video stream(s) can be based on a peer networking session, in which each user (or each client device used in the peer networking session) receives a user-specific video stream. In this manner, the user generated content (e.g., the user captured video stream and/or image data) can be captured, analyzed, and/or shared in a similar manner as those described herein.

Figure 10:
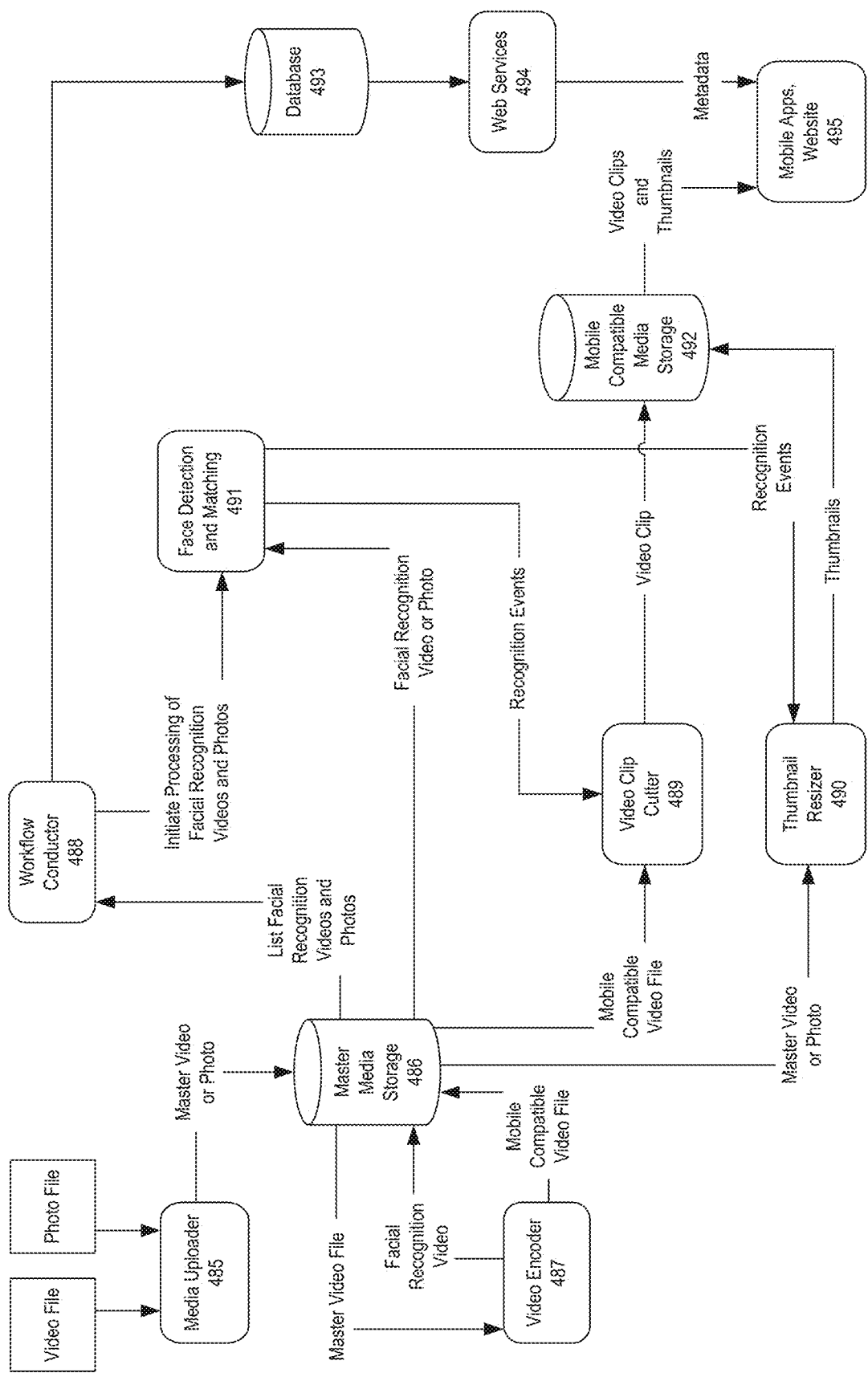
FIG. 10 is a flowchart illustrating a method of using a video recognition system according to another embodiment.

FIG. 10 is a flowchart illustrating a method of presenting a contextual video stream to, for example, a mobile device associated with a user according to an embodiment. In some instances, a video file(s) and/or a photo file(s) can be uploaded to a media uploader 485. The media uploader 485 can be any suitable device configured to receive and/or process video and/or image files such as, for example, the host device 110 described above with reference to FIGS. 1 and 2. A master video and/or photo file is then stored in a master media storage 486. The master media storage 486 can be any suitable storage device. For example, the master media storage 486 can be included in and/or a part of memory included in the media uploader 485. In other embodiments, the master media storage 486 can be a database or the like such as, for example, the database 140 described above with reference to FIGS. 1A and 1B.

In some instances, the master video file can be sent from the master media storage 486 to a video encoder 487. The video encoder 487 can be any suitable device or portion of a device configured to convert the master video file into one or more desired formats. For example, as shown in FIG. 10, the video encoder 487 can convert the master video file into a facial recognition video and a mobile-compatible video file, each of which are stored in the master media storage 486. A list of one or more facial recognition video files and/or photo files is then sent to a workflow conductor 488, which can prioritize, organize, and/or otherwise control an order in which files are subsequently processed and can send a signal operable in initiating processing of the facial recognition video file(s) and/or photo file(s) to a face detection and matching processor 491 (e.g., a processor, module, device, etc. such as, for example, the analysis module 121 described above with reference to FIG. 2), as described in further detail herein. In addition, an indication associated with the workflow can be sent from the workflow conductor 488 to a database 493, which can store the indication associated with the workflow and that can send data associated with the indication to a web service processor 494 (e.g., an Internet website service provider, processor, module, and/or device), as described in further detail herein.

As shown in FIG. 10, the mobile compatible video file is sent from the master media storage 486 to a video clip cutter 489, which can also receive data associated with recognition events, as described in further detail herein. The master video file or photo file is sent from the master media storage 486 to a thumbnail resizer 490, which can also receive data associated with the recognition events, as described in further detail herein. The facial recognition video or photo file(s) is/are sent from the master media storage 486 to the face detection and matching processor 491, which in turn can perform any suitable facial recognition process to define the recognition events. Moreover, the face detection and matching processor 491 can analyze and/or process the facial recognition video and/or photo file in accordance with the priority and/or order defined by the workflow conductor 488.

As described above, data associated with the recognition events can then be sent from the face detection and matching processor 491 to the video clip cutter 489 and the thumbnail resizer 490. The video clip cutter 489 can be any suitable processor, module, and/or device that can receive the mobile-compatible video file and that can subsequently trim, cut, extract, separate, and/or otherwise define a video clip associated with the recognition events of a user within the facial recognition video and/or photo. The video clip associated with the recognition event of the user can then be sent from the video clip cutter 489 to a mobile-compatible media storage 492. The thumbnail resizer 490 can be any suitable processor, module, and/or device that can receive the master video and/or photo file(s) and that can subsequently define one or more thumbnails (e.g., small images with a relatively small file size, which in turn, can be associated with and/or indicative of a larger image and/or video). In this embodiment, the thumbnails can be associated with and/or indicative of the recognition events and can be sent from the thumbnail resizer 490 to the mobile-compatible media storage 492.

As shown in FIG. 10, the video clips and the thumbnails can be sent from the mobile-compatible media storage 492, for example, to one or more mobile applications and/or websites 495. For example, in some instances, the video clips and thumbnails can be sent to an Internet server or the like, which in turn, can present the video clips and thumbnails on a website or the like. In other instances, the video clips and thumbnails can be sent to a client device associated with the user, which in turn, can present the video clips and thumbnails on a display (e.g., when a mobile application is opened, selected, running, etc.). Moreover, metadata (e.g., user identity, identity of event, location of event, location of a client device, etc.) or the like associated with the indication of the workflow (described above) can be sent from the web services processor 494 to the mobile application and/or websites 495. In this manner, a video clip of a user and any contextual and/or metadata associated therewith can be sent to and/or accessed by the user via a mobile application and/or website.

While various embodiments have been described above, it should be understood that they have been presented by way of example only, and not limitation. For example, while the embodiments and methods have been described herein as defining a contextual video stream of a user at an event or the like and sending the contextual video stream to a client device and/or otherwise allowing access to the contextual video stream via, for example, a web browser and the Internet, in other embodiments, a host device can store, in a database, any number of contextual video streams associated with a user. In some instances, the host device can be configured to define a user profile or the like that can include any number of contextual video streams of the user. In some instances, the user can access his or her user profile via a mobile application, a computer application, a web browser and the Internet, and/or the like. Moreover, in some instances, the user can share or otherwise request the host device to share any number of contextual video streams of the user with a different user and/or via a social media site. In some instances, a user can allow access to a portion of his or her user profile such that other users can view the contextual video streams included therein.

While specific examples have been particularly described above, the embodiments and methods described herein can be used in any suitable manner. For example, while the system 100 is described above as defining a contextual video stream of a user at a sporting event, in other embodiments, the methods described herein can be used to identify an individual using, for example, facial recognition and video analytics in any suitable setting, venue, arena, event, etc. For example, in some embodiments, the methods described above can be used to capture a contextual video stream at a concert, a rally, a graduation, a party, a shopping mall, a place of business, etc. In one example, a host device can receive a contextual video stream from, for example, a graduation. In some instances, as described above, the host device can perform any suitable facial recognition and/or video analytics to identify the graduate (and/or any individual and/or user). Moreover, the host device can be configured to analyze contextual information such as, a user profile associated with the graduate, an order of students walking across the stage, location data associated with the graduate's client device, and/or any other suitable data. As such, the host device can analyze the data to verify the identity graduate (e.g., when the data satisfies a criteria(ion))

and can define a contextual video stream of the graduate, for example, as he or she walks across the stage to receive a diploma or the like. In other instances, the host device can identify a family member or friend of the graduate and can define a contextual video stream of him or her in a similar manner.

While the embodiments have been particularly shown and described, it will be understood that various changes in form and details may be made. Although various embodiments have been described as having particular features and/or combinations of components, other embodiments are possible having a combination of any features and/or components from any of embodiments as discussed above.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

While specific methods of facial recognition have been described above according to specific embodiments, in some instances, any of the methods of facial recognition can be combined, augmented, enhanced, and/or otherwise collectively performed on a set of facial recognition data. For example, in some instances, a method of facial recognition can include analyzing facial recognition data using Eigenvectors, Eigenfaces, and/or other 2-D analysis, as well as any suitable 3-D analysis such as, for example, 3-D reconstruction of multiple 2-D images. In some instances, the use of a 2-D analysis method and a 3-D analysis method can, for example, yield more accurate results with less load on resources (e.g., processing devices) than would otherwise result from only a 3-D analysis or only a 2-D analysis. In some instances, facial recognition can be performed via convolutional neural nets (CNN) and/or via CNN in combination with any suitable 2-D analysis methods and/or 3-D analysis methods. Moreover, the use of multiple analysis methods can be used, for example, for redundancy, error checking, load balancing, and/or the like. In some instances, the use of multiple analysis methods can allow a system to selectively analyze a facial recognition data set based at least in part on specific data included therein.

While the embodiments have been described above as being performed on specific devices and/or in specific portions of a device, in other embodiments, any of the embodiments and/or methods described herein can be performed on any suitable device. For example, while the contextual video streams have been described above as being sent to a host device (e.g., the host device 110) for facial recognition and/or image analysis, in other embodiments, any suitable analysis can be performed on or at a client device. For example, in some instances, a user can capture a video stream (e.g., a contextual video stream) via a camera of the client device and in response, the client device can analyze the video to identify any number of registered users or the like in the video stream. In some instances, the analysis can be via a convolutional neural net sent to and/or stored on the client device (e.g., stored in memory and associated with the system application). In some instances, the analysis can be pre-processed and/or pre-sorted based on, for example, the user's contact list, friends list, established connections, etc., as described above. In some instances, the client device can send a user-specific video stream to any identified user, as described above. In other embodiments, the client device can upload and/or send the analyzed video stream and/or the user-specific video stream(s) to the host device 110 and/or the database 140.

While video streams and/or image data is described above as being "contextual," it should be understood that the video stream data and/or image data can be independent of and/or unassociated with "contextual data." For example, in some instances, a user can capture a video stream and/or image and can upload the video stream and/or image for processing without defining and/or sending contextual data associated with the video stream and/or image data. In some instances, a host device or the like (e.g., the host device 110) can receive the user-generated video stream and/or image data and in response, can perform one or more facial recognition processes and/or any other suitable analytics on the data to define, for example, a user-specific video stream or user-specific image that is independent of contextual data.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, FORTRAN, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed:

1. An apparatus, comprising:
   a memory;
   a communication interface in communication with the memory and configured to communicate via a network; and
   a processor in communication with the memory and the communication interface, the processor configured to:
   receive, via the network and the communication interface, a signal including data representing at least one image captured by an image capture device and contextual data associated with the at least one image,
   identify a venue based on the contextual data associated with the at least one image,
   request location data associated with a client device,
   analyze the at least one image via facial recognition with respect to facial image data of a user associated with the client device when the location data associated with the client device is within a threshold distance from a location associated with the venue, the facial image data of the user included in a user profile data structure stored in the memory,
   define user-specific data when a result of the analyzing indicates an identification of the user in the at least one image, the user-specific data including an instance of data representing at least one image of the user from the at least one image received from the image capture device and data representing at least an indication of a coinciding event occurring at the venue, and
   send, via the network and the communication interface, the user-specific data such that the user can access the user-specific data via the client device.

2. The apparatus of claim 1, wherein the client device is one of a tablet, a smartphone, or a wearable electronic device.

3. The apparatus of claim 1, wherein the coinciding event is an event occurring at the venue at a time that at least partially coincides with a time at which the image capture device captures the at least one image.

4. The apparatus of claim 1, wherein each of the user associated with the client device and the coinciding event are depicted in the at least one image received from the image capture device.

5. The apparatus of claim 1, wherein the processor is configured to define a confidence level associated with identifying the user based on analyzing the at least one image via facial recognition with respect to the facial image data of the user,
   the processor is configured to define the user-specific data when the confidence level satisfies a confidence threshold.

6. The apparatus of claim 1, wherein the location data associated with the client device is global positioning system (GPS) location data.

7. The apparatus of claim 1, wherein the requesting location data associated with the client device includes requesting the location data and other contextual data from the client device, the other contextual data including at least one of calendar data, preference data, social media data, check-in data, or purchase data.

8. A method, comprising:
   receiving, at a host device and via a network, a signal including data representing at least one image captured by an image capture device;
   identifying a venue based on contextual data associated with the at least one image, the contextual data including an indication of a coinciding event occurring at the venue;
   requesting location data associated with a client device, data associated with the client device being stored in a database, the data including at least facial image data of a user associated with the client device;
   analyzing the at least one image via facial recognition with respect to the facial image data of the user when the location data associated with the client device is within a threshold distance from a location associated with the venue;
   defining user-specific data including (1) an instance of data representing at least one image of the user from the at least one image received from the image capture device and (2) data representing at least an indication of the coinciding event, when a result of the analyzing indicates an identification of the user in the at least one image; and
   sending, from the host device to the client device, a signal indicative of an instruction to present the user-specific data on a display of the client device.

9. The method of claim 8, wherein the client device is one of a tablet, a smartphone, or a wearable electronic device.

10. The method of claim 8, wherein the coinciding event is an event occurring at the venue at a time that at least partially coincides with a time at which the image capture device captures the at least one image.

11. The method of claim 8, wherein each of the user and the coinciding event is depicted in the at least one image received from the image capture device.

12. The method of claim 8, further comprising:
    defining a confidence level associated with identifying the user based on the analyzing the at least one image via facial recognition with respect to the facial image data of the user,
    the defining the user-specific data is in response to the confidence level satisfying a confidence threshold.

13. The method of claim 8, wherein the requesting location data associated with the client device includes requesting global positioning system (GPS) location data.

14. The method of claim 8, wherein the requesting location data associated with the client device includes requesting the location data and other contextual data from the client device, the other contextual data including at least one of calendar data, preference data, social media data, check-in data, or purchase data.

15. A method, comprising:
    receiving, at a host device and via a network, facial image data of a user associated with a client device;
    storing data associated with the user in a database, the data including at least the facial image data and data associated with the client device;
    receiving, at the host device and via the network, a signal including image data captured by an image capture device and contextual data associated with the image data;
    identifying a venue and a coinciding event occurring at the venue based at least in part on the contextual data;
    analyzing the image data via facial recognition with respect to the facial image data of the user stored in the database when global positioning system (GPS) location data associated with the client device is within a proximity threshold associated with the venue;
    defining user-specific data when a confidence level associated with identifying the user in the image data during the analyzing satisfies a criterion, the user-specific data including an instance of data representing at least one image of the user from the image data and data representing at least an indication of the coinciding event; and sending, from the host device to the client device, a signal indicative of an instruction to present the user-specific data on a display of the client device.

16. The method of claim 15, wherein the client device is one of a tablet, a smartphone, or a wearable electronic device.

17. The method of claim 15, wherein the image data includes at least one image of the user captured during a time contemporaneous with the coinciding event.

18. The method of claim 15, wherein the criterion is a minimum confidence level associated with identifying the user in the image data.

19. The method of claim 15, further comprising:
sending, from the host device and to the client device via the network, a request for the GPS location data prior to the analyzing the image data.

20. The method of claim 15, further comprising:
sending, from the host device and to the client device via the network, a request for contextual data associated with the client device, the contextual data including at least one of the GPS location data, calendar data, preference data, social media data, check-in data, or purchase data.

\* \* \* \* \*